(12) United States Patent
Voss

(10) Patent No.: US 10,029,514 B2
(45) Date of Patent: Jul. 24, 2018

(54) BICYCLE TENSIONING DEVICE

(71) Applicant: Darrell W. Voss, Vancouver, WA (US)

(72) Inventor: Darrell W. Voss, Vancouver, WA (US)

( * ) Notice: Subject to any disclaimer, the term of this patent is extended or adjusted under 35 U.S.C. 154(b) by 20 days.

(21) Appl. No.: 14/777,456

(22) PCT Filed: Mar. 13, 2014

(86) PCT No.: PCT/US2014/026443
§ 371 (c)(1),
(2) Date: Sep. 15, 2015

(87) PCT Pub. No.: WO2014/151783
PCT Pub. Date: Sep. 25, 2014

(65) Prior Publication Data
US 2016/0031521 A1 Feb. 4, 2016

Related U.S. Application Data

(63) Continuation-in-part of application No. 13/839,168, filed on Mar. 15, 2013, now Pat. No. 9,409,619.

(60) Provisional application No. 61/869,015, filed on Aug. 22, 2013.

(51) Int. Cl.
B60B 27/02 (2006.01)
B62K 25/02 (2006.01)
B62K 21/02 (2006.01)

(52) U.S. Cl.
CPC .......... *B60B 27/026* (2013.01); *B62K 25/02* (2013.01); *B62K 21/02* (2013.01); *B62K 2025/025* (2013.01)

(58) Field of Classification Search
CPC .. B60B 27/026; B62K 25/02; B62K 2025/025
See application file for complete search history.

(56) References Cited

U.S. PATENT DOCUMENTS 6,497,314 B2 12/2002 Kanehisa
7,562,942 B2 7/2009 D'Aluisio
(Continued)

FOREIGN PATENT DOCUMENTS

GB 2414971 A 12/2005
WO 2006138699 A2 12/2006

OTHER PUBLICATIONS

Patent Cooperation Treaty Written Opinion of the International Searching Authority for PCT/US2014/026443, Applicant: Darrell W. Voss, dated Sep. 15, 2015, European Patent Office, Munich, Germany.
Patent Cooperation Treaty International Preliminary Report on Patentability (Chapter I of the Patent Cooperation Treaty) for PCT/US2014/026443, Applicant: Darrell W. Voss, dated Sep. 15, 2015, The International Bureau of WIPO, Geneva, Switzerland.
(Continued)

*Primary Examiner* — Kip T Kotter
(74) *Attorney, Agent, or Firm* — Young's Patent Services, LLC; Bruce A. Young

(57) ABSTRACT

A tensioning device for bicycle front and rear wheel assemblies. A skewer assembly with a thumbnut is securable to the wheel assembly with a quick-release assembly. Portions of the skewer assembly are removable from the quick-release assembly by turning the thumbnut a partial turn, such as a quarter of a turn. Removal of the skewer assembly allows the front wheel to be removed. In another embodiment, the skewer assembly is able to be removed by turning the quick-release assembly by a partial turn, such as a quarter of a turn.

12 Claims, 38 Drawing Sheets

(56) References Cited

U.S. PATENT DOCUMENTS

| | | | |
|---|---|---|---|
| 8,042,881 B2 * | 10/2011 | Inoue ................... | B62K 23/06 280/279 |
| 8,382,134 B2 | 2/2013 | Bartlett et al. | |
| 8,382,415 B1 | 2/2013 | Goldbaum | |
| 8,449,045 B2 | 5/2013 | Ashman | |
| 2004/0046353 A1 * | 3/2004 | Neugent ................ | B62K 25/02 280/274 |
| 2007/0052286 A1 * | 3/2007 | Montague .............. | B62K 25/02 301/124.2 |
| 2007/0145814 A1 | 6/2007 | D'Aluisio | |
| 2008/0211295 A1 * | 9/2008 | Bartlett ................. | B62K 25/02 301/124.2 |
| 2011/0133543 A1 | 6/2011 | Ashman | |
| 2013/0033096 A1 | 2/2013 | Howes | |
| 2013/0049322 A1 | 2/2013 | Rose et al. | |
| 2013/0099557 A1 | 4/2013 | Bartlett et al. | |
| 2013/0241271 A1 | 9/2013 | Lim | |

OTHER PUBLICATIONS

Patent Cooperation Treaty International Search Report for PCT/US2014/026443, Applicant: Darrell W. Voss, dated Sep. 5, 2014, European Patent Office, Rijswijk, NL.

Marlon Alexander Arce, Non-Final Office Action for U.S. Appl. No. 13/839,168, Darrell W. Voss, dated Mar. 28, 2014, United States Patent and Trademark Office, Alexandria, VA US.

Marlon Alexander Arce, Final Office Action for U.S. Appl. No. 13/839,168, Darrell W. Voss, dated Jan. 13, 2015, United States Patent and Trademark Office, Alexandria, VA US.

Marlon Alexander Arce, Non-Final Office Action for U.S. Appl. No. 13/839,168, Darrell W. Voss, dated May 28, 2015, United States Patent and Trademark Office, Alexandria, VA US.

Marlon Alexander Arce, Final Office Action for U.S. Appl. No. 13/839,168, Darrell W. Voss, dated Nov. 13, 2015, United States Patent and Trademark Office, Alexandria, VA US.

* cited by examiner

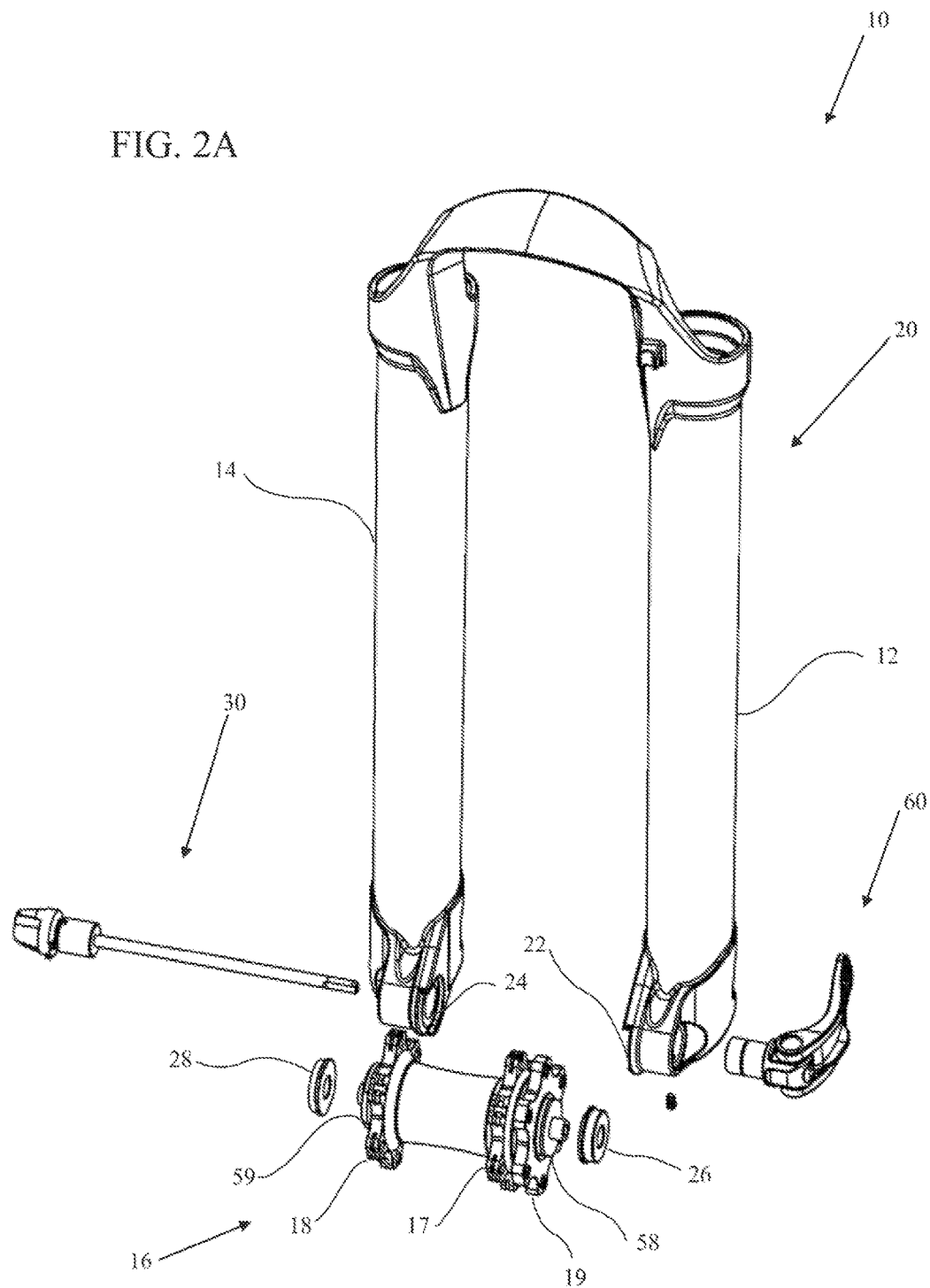

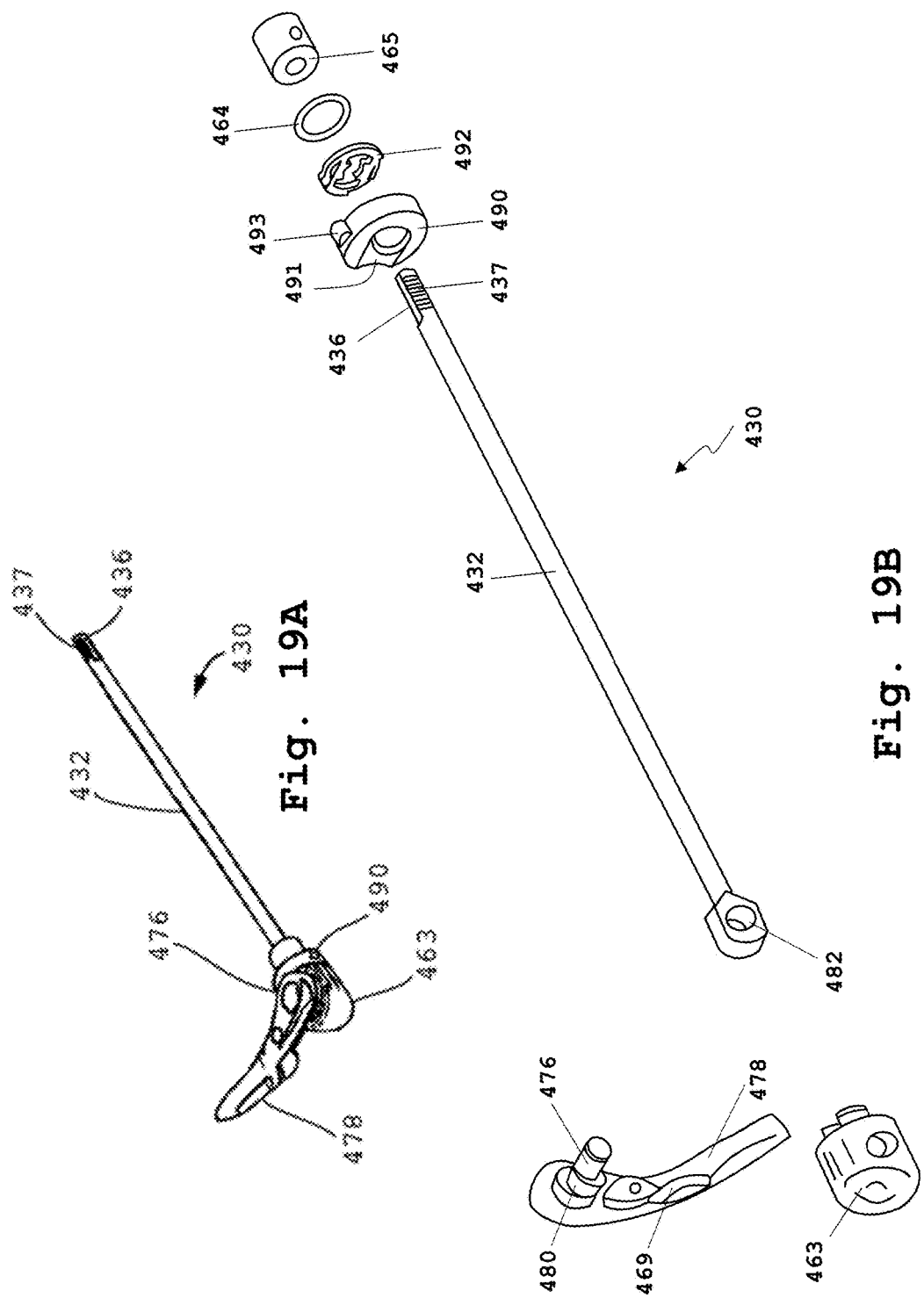

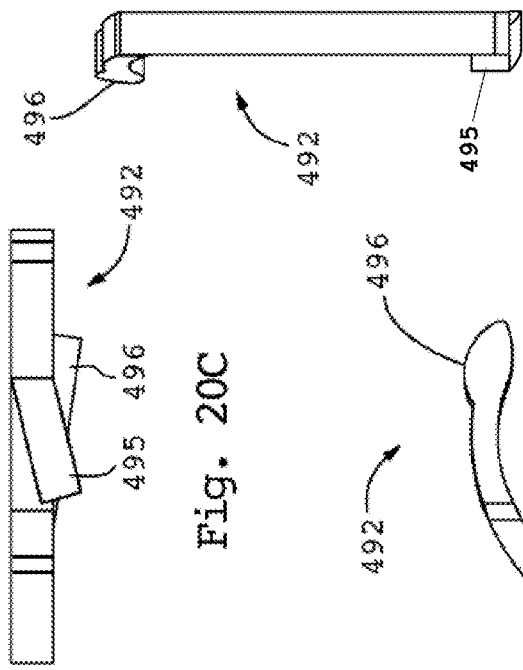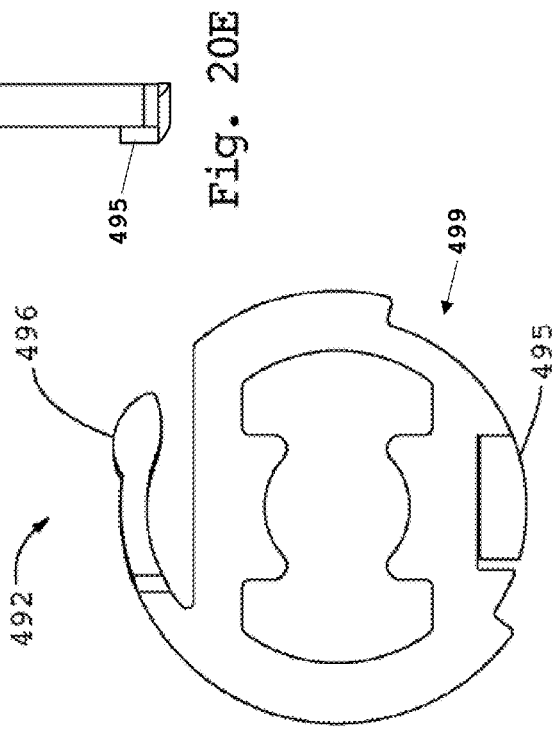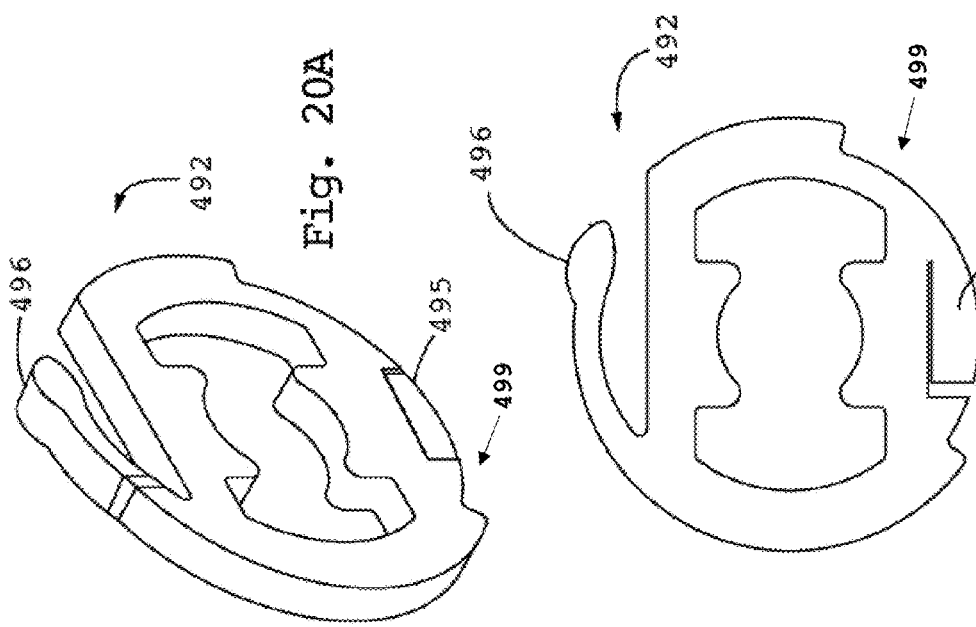

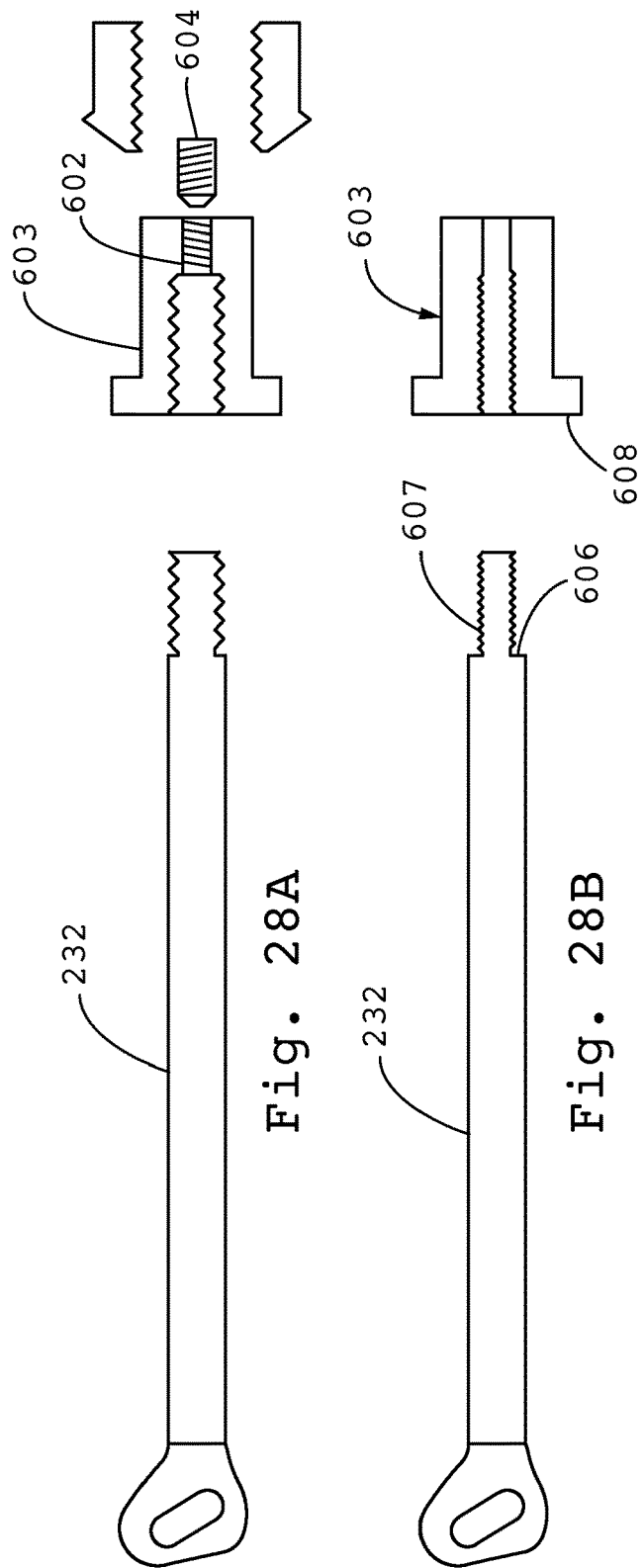

BICYCLE TENSIONING DEVICE

CROSS REFERENCE TO RELATED APPLICATIONS

This application is a National Stage filing of International Application No. PCT/US2014/026443 filed on Mar. 13, 2014, which claims benefit to U.S. Provisional Application No. 61/869,015 filed on Aug. 22, 2013 and is a continuation in part of U.S. patent application Ser. No. 13/839,168 filed on Mar. 15, 2013, now U.S. Pat. No. 9,409,619, the contents of which are herein incorporated by reference.

FIELD OF THE INVENTION

The field of the invention relates generally to tension clamping members for a bicycle. The invention relates more particularly to a quick-release skewer assembly for securing a bicycle wheel.

BACKGROUND OF THE INVENTION

Bicycle quick-release mechanisms are utilized to allow a bicycle wheel to be quickly disconnected from the bicycle frame for repair, maintenance, securement to a bike rack, or shipping when the bicycle is not in use. Bicycle wheel quick-release ("QR") mechanisms are available for both the front and rear wheels. Conventional quick-release mechanisms utilize a quick-release lever assembly located on one side of one of the bicycle dropouts—front and/or back. The term "dropout" herein refers to the wheel mount at the fork or rear of the bicycle, whether an open slot or a capturing hole for the axle to be secured within.

The quick-release lever assembly attaches to one end of a skewer shaft. The other end of the skewer shaft is attached to a manually operated nut. In use, to remove a bicycle front wheel, the quick-release lever is operated to an open position. In the open position, the skewer assembly is not clamped to the front forks of the bicycle. To completely remove the bicycle front wheel, in some common designs, the nut on the end of the skewer opposite the QR lever must be loosened at least several turns. The bicycle wheel can then be removed by removing the wheel from downwardly oriented dropout slots in the forks. Note that the design is called a "quick-release", but the secondary retention devices require that the nut be unscrewed extensively such that it really is not quick.

This design also has the disadvantage of the wheel hub axle not being captured in through-holes in the forks. Due to this disadvantage, the front wheel of a bicycle with this type of quick-release design has the potential to fall-off the dropout slots in the forks if an inadequate clamping force of the skewer assembly to the front forks is applied by operation of the quick-release lever of the quick-release assembly. This is of particular concern where disc brakes, in lieu of rim brakes, are utilized. On rim brakes, the moment arm from the axle is much greater and is about the same as the radius of the wheel, so the applied braking force at the rim is relatively small. However, on disc brakes, which are located proximal the hub axle, the moment arm about the axle is much smaller than the radius of the wheel, so the applied forces on the wheel brake disc by the brake pads are much larger. In addition, these applied forces by the brake pads may be oriented in a generally downward direction, if the brake pads are mounted aft of the lower portion of the forks.

Due to this configuration, there is a potential for bicycle front wheels with disc brakes and downwardly oriented dropout slots to have the front wheel come off during use of the bicycle, particularly when the tool-less quick-release assembly has not been properly adjusted to provide an adequate clamping force. Breakage of the dropout tabs and/or the jacking out of the axle from the vehicle frame member may also result during use, potentially causing injury to the rider. Due to this risk, instead of using conventional open dropout slots, some bicycle structures have through-holes instead of dropout slots. However, this dropout design requires the skewer rod to be removed from the fork through the through-holes in order to remove the wheel. To facilitate this, a manually operated nut may be attached to the skewer rod, which may be threaded into the quick-release assembly. The manually operated nut in this type of fork design must be unscrewed completely to allow the skewer rod to be disengaged from the component it is threaded into. Once this occurs, the skewer rod is removed, which allows the bicycle front wheel to be removed from the front forks (and parts to be lost). To reinstall the front wheel, the bicycle wheel is placed between the front forks and the manually operated nut with the attached skewer rod is threaded into the appropriate component. However, the unscrewing (or loosening) and tightening of the manually operated nut while also properly locating the wheel between the forks may be difficult to accomplish consistently and adequately. In addition, the thread engagement of the skewer rod to the component the skewer rod threads into must be of a proper length in order to provide a proper clamping force of the QR skewer assembly to the forks when the quick-release lever is closed. Adequate and consistent tension with the nut and skewer is not always obtained, especially by an inexperienced user.

Accordingly, a need exists in the art for a bicycle wheel quick-release skewer assembly that utilizes vehicle dropouts or rear mounts with through-holes instead of dropout slots that easily allows a bicycle wheel to be removed from the dropouts and reinstalled to the without having to loosen (and completely remove in some instances) and tighten a manually operated nut attached to the tensioning member. A need also exists in the art for a bicycle quick-release mechanism that utilizes through-holes instead of dropout slots that allows for reinstallation of the bicycle front or rear wheel that does not require precise hand tightening of the manually operated nut in order to achieve a proper clamping force of the bicycle quick-release skewer assembly.

Disc brake mounts are secured near the dropouts to secure the disc brake mechanism. At times, the user may wish to change the size of the brake disc, requiring the user to secure an adaptor to the mount to align the brake pad mechanism with the different brake disc. For example, the user may move from a 140 mm disc to a 160 mm disc in order to have increased leverage for additional stopping power. Alignment of the brake pad mechanism is vital to a smooth, free-running wheel and to effective braking. However, this can be difficult with a conversion to a different size disc. Removing the heat from the disc brake mechanism can also prove to be difficult.

SUMMARY OF THE INVENTION

The present invention solves the above need in the art to not require loosing of a manually operated nut in order to remove a skewer rod and precise tightening of a manually operated nut in order to reinstall a skewer rod for frame designs utilizing through-holes instead of dropout slots to retain the wheel hub to the wheel mount—either the forks or the rear mount. This need is satisfied by use of a quick-release skewer assembly. The quick-release skewer assembly only requires a portion of a complete turn, such as quarter turn of a manually operated thumbnut to remove or reinstall the skewer rod, in one embodiment. In another embodiment, a quick-release lever only requires a portion of a turn, such as a quarter turn, to remove or reinstall the tensioning member. The present invention also allows for precise regulation of the clamping force applied to the left and right forks by the quick-release skewer assembly. The invention may be used with either front or rear dropout type mountings to provide an easier mount procedure and more consistent clamping force.

In one embodiment, a front portion of a bicycle includes a hub assembly and a skewer assembly; the skewer assembly includes a thumbnut. The front portion of the bicycle also includes a quick-release assembly. The skewer assembly is selectively engagable to the quick-release assembly by selectively aligning opposing threaded portions of the skewer assembly and the quick-release assembly. Portions of the skewer assembly may be removed from the quick-release assembly and the left and right forks by turning the thumbnut a quarter of a turn after the clamping force is released by opening the quick-release lever.

In another embodiment, a front portion of a bicycle includes a fork assembly; the fork assembly including a left fork leg and a right fork leg. The front portion of the bicycle further includes a hub assembly, a skewer assembly, and a quick-release assembly. The quick-release assembly includes a quick-release lever. The skewer assembly is selectively threadably engaged to a right fork bushing by selectively aligning opposing threaded portions of the skewer assembly and the right fork bushing. The right fork bushing is threaded into a hole in a lower portion of the right fork leg. The skewer assembly is capable of being removed from the right fork bushing by turning the quick-release lever a portion of a turn about the axis of the axle.

In a further embodiment, a front portion of a bicycle includes a fork assembly; the fork assembly including a left fork leg and a right fork leg, the fork assembly including a through-hole in a lower portion of the left fork leg and a lower portion of the right fork leg, the left and right fork legs each including a slot in an inboard side of the lower portion of the left and right fork legs. The front portion of a bicycle includes a hub assembly, the hub assembly including a left end portion configured with opposing flat caps (shaped as washers or discs) and a right end portion of the hub assembly is configured with opposing caps. The front portion of a bicycle additionally includes a skewer assembly, the skewer assembly including a skewer rod, the skewer rod being installed within the through-holes in the lower portion of the left fork leg and right fork leg and a quick-release assembly. The left end portion of the hub with opposing caps allows the left end portion to be received in the left fork slot; the right end portion of the hub with opposing flat spots allows the right end portion of the hub assembly to be received in the right fork slot. The front wheel is not capable of being removed from the fork assembly without the skewer rod being removed from the through-holes in the lower portion of the left and right fork legs.

In use, the quick-release lever is operated to orient the quick-release lever from a closed orientation in which the quick-release (QR) skewer assembly is clamped to the front forks, to an open orientation in which the QR assembly is not clamped to the front forks. In one embodiment, a thumbnut in contact with the right fork leg is rotated a partial turn (approximately one-quarter turn) to allow the skewer assembly to be removed from the wheel hub assembly and from through-holes in the front forks. Reinstallation is the reverse of the above. In another embodiment, a quick-release lever proximal the fork leg is rotated a partial turn (e.g., one-quarter turn) to allow the skewer assembly to be removed from the wheel hub assembly and from through-holes in the front forks. Reinstallation is the reverse of the above. The same applies to the rear dropouts.

The invention herein may also be more broadly applicable to most types of vehicles, or to fasteners in general. The fastener includes a shaft and an engagement mechanism. Preferably, the shaft has a longitudinal axis and an end with multiple teeth in series one after another partially along the longitudinal axis. Each tooth runs transverse to the longitudinal axis, the teeth being disposed on at least a first side of the shaft. The shaft includes an adjacent second side that is recessed relative to the first side, such that it does not extend as far from the longitudinal axis of the shaft.

The engagement mechanism is configured to engage the multiple teeth on the shaft when the shaft is oriented in a first rotational position. The mechanism disengages the teeth on the shaft when the shaft is oriented in a second rotational position. The engagement mechanism includes teeth that selectively engage the shaft teeth in the first rotational position.

In a preferred embodiment, the shaft includes a second set of teeth extending along a third side of the shaft opposite the first-side teeth and adjacent to the second, recessed side of the shaft. The shaft also includes a fourth side, recessed relative to the third side teeth and relative to the first-side teeth. Preferably, the second and fourth sides do not include teeth.

The shaft further includes a head on the end thereof beyond the teeth. The head extends from the longitudinal axis of the shaft further than the second side. The head extends outwardly further than the second side in the direction of the first side, such that the head will not engage with the teeth from the engagement mechanism. Thus, the head restricts rotation of the shaft unless the head is extended beyond the teeth of the engagement mechanism. This helps ensure proper tension engagement. The engagement mechanism includes two opposite sets of teeth that engage the first and second sets of shaft teeth upon rotation of the shaft to the second rotational position.

A tensioning mechanism is coupled to at least one of the shaft and the engagement mechanism. The tensioning mechanism operates to place tension on the shaft after the engagement mechanism is in the second rotational position with the teeth engaged. The tensioning mechanism includes a cam and a lever rotatable with the cam to move the cam and the engagement mechanism toward and away from the shaft. The tensioning mechanism further includes a secondary retention member to restrain the movement of the lever.

BRIEF DESCRIPTION OF THE DRAWINGS

Preferred and alternative examples of the present invention are described in detail below with reference to the following drawings:

FIG. 2A illustrates an isometric view of a quick-release assembly and skewer rod assembly removed from a front fork of a bicycle according to an embodiment;

FIG. 19A illustrates an isometric view of a QR and skewer of an embodiment;

FIG. 19B illustrates an exploded perspective view of the QR and skewer of FIG. 19A;

FIG. 20A illustrates a front perspective view of the clocking washer from FIGS. 19A-C;

FIG. 20B illustrates a front view of the clocking washer of FIG. 20A;

FIG. 20C illustrates a top plan view of the clocking washer of FIG. 20A;

FIG. 20D illustrates an alternate front view of the clocking washer of FIG. 20A;

FIG. 20E illustrates a side view of the clocking washer of FIG. 20A;

FIG. 28A illustrates an alternate embodiment of skewer tensioning system;

FIG. 28B illustrates an additional alternate embodiment of skewer tensioning system;

DETAILED DESCRIPTION OF THE PREFERRED EMBODIMENTS

Figure 1A:
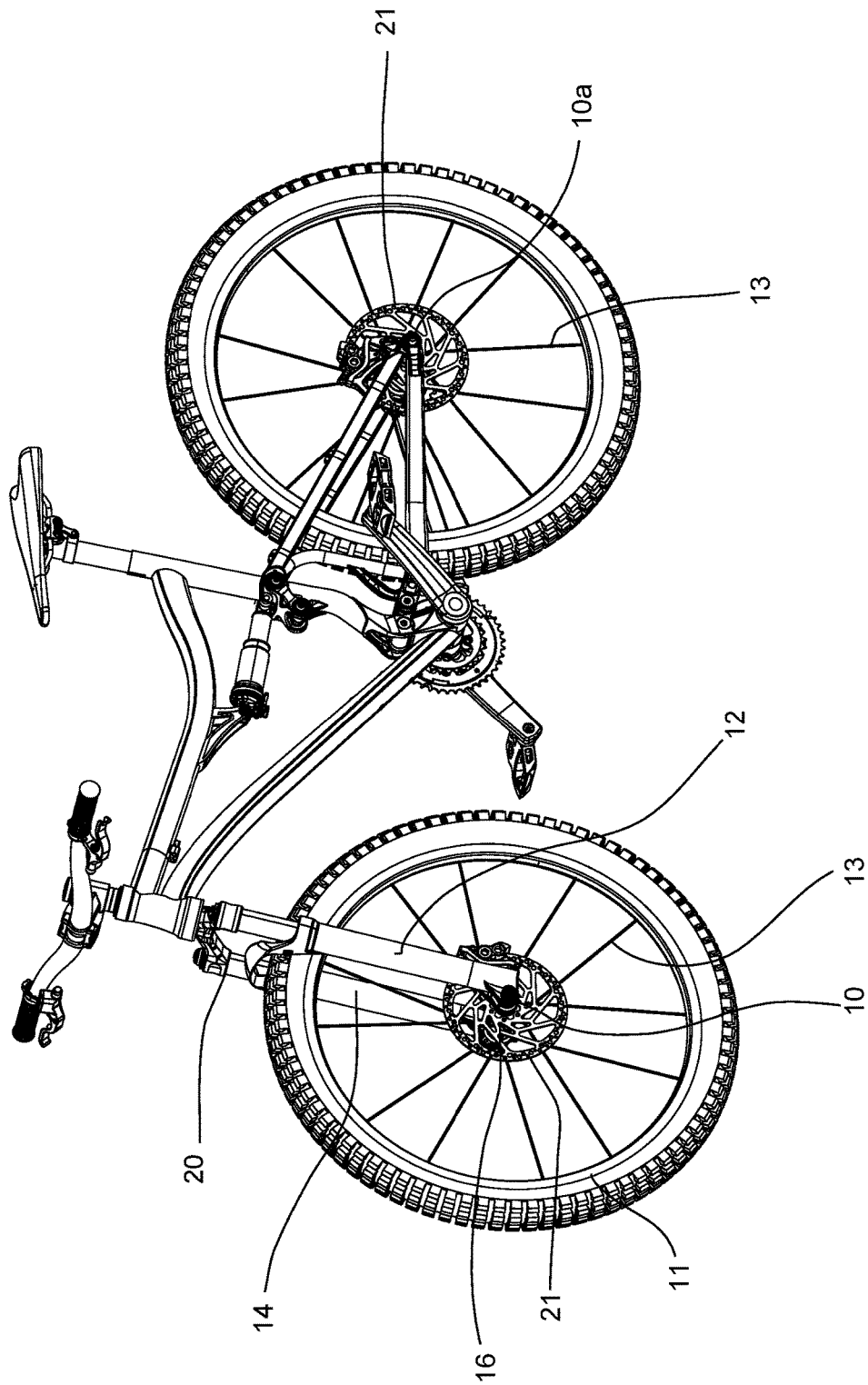
FIG. 1A illustrates an isometric view of a bicycle, including the tensioning members according to an embodiment.
Figure 1B:
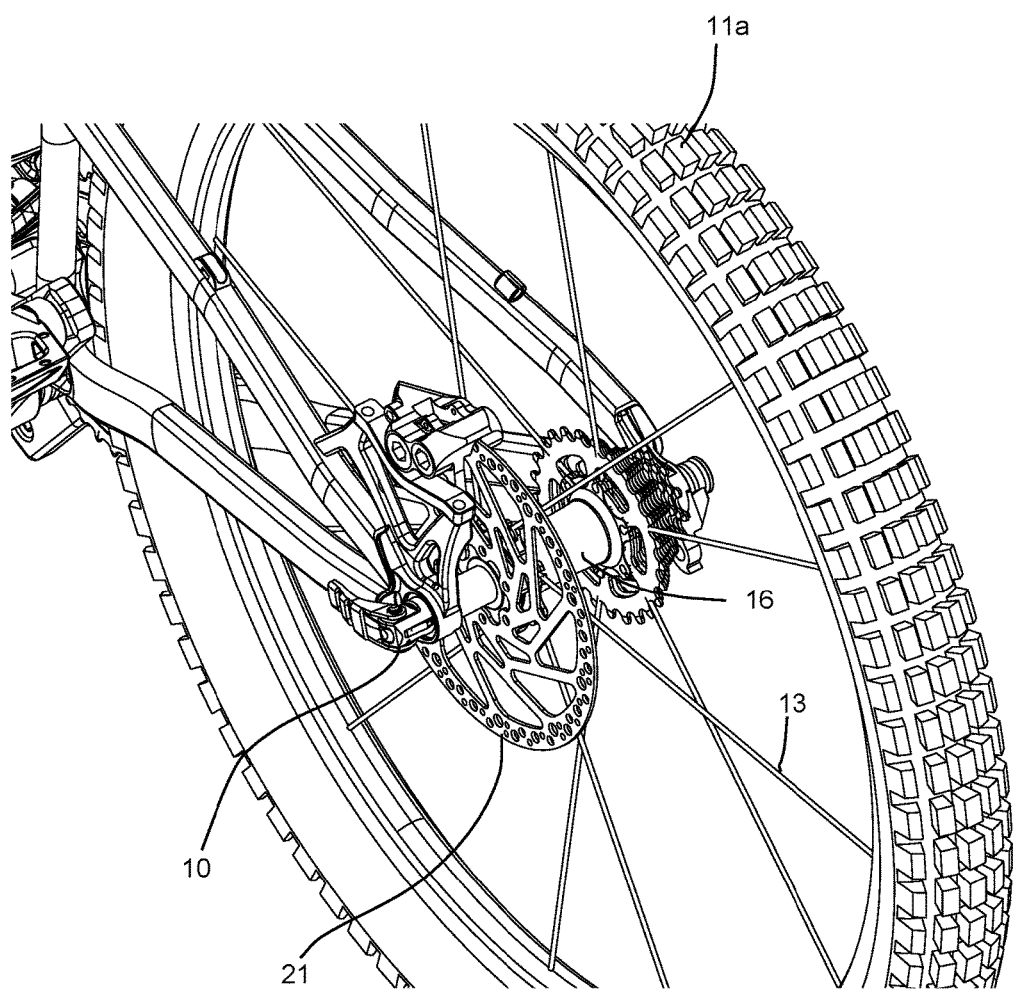
FIG. 1B is a rear close-up isometric view of the rear wheel showing the QR lever securing the rear axle in place.

FIGS. 1A and 1B illustrate a bicycle having disc brakes, dropouts, and QR levers front and rear. The bicycle includes a quick-release skewer (i.e., tension rod assemblies) assemblies 10, 10a, a front wheel 11, rear wheel 11a, a hub assembly 16 (partially hidden behind the brake discs in FIG. 1A), and a fork assembly 20. The front portion of the bicycle further includes a left fork leg 12, a right fork leg 14, bicycle spokes 13, and brake discs 21.

Figure 2B:
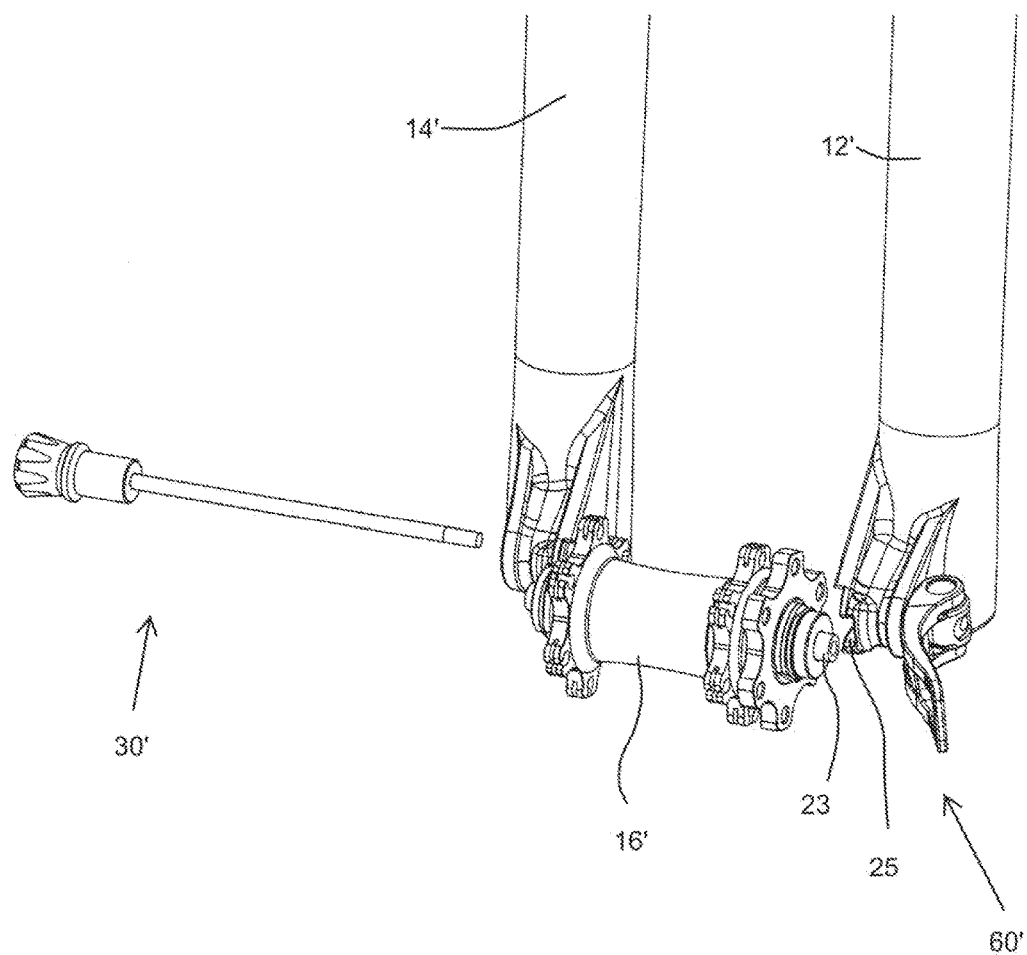
FIG. 2B shows another version of a QR assembly with a tensioning rod released from a QR lever to remove a hub.

FIG. 2A illustrates an isometric view of a quick-release skewer assembly 10 and a fork assembly 20 looking toward a rear direction according to an embodiment. The quick-release skewer assembly 10 of FIGS. 2-5 is primarily intended for a hub assembly 16 with a 9 mm axle, but the embodiments of FIGS. 2-5 are not limited to this size axle. As illustrated in FIGS. 2A and 2B, the quick-release skewer assembly 10 is mounted to a left fork leg 12 and a right fork leg 14. Located between the left fork leg 12 and the right fork leg 14 is the wheel hub assembly 16. The wheel hub assembly 16 includes a rotating portion, which rotates with the front wheel tire, brake disc, and spokes, and a non-rotating portion, which is mounted to the left 12 and right 14 fork legs. The rotating and non-rotating portions of the wheel hub assembly 16 are separated by bearings (not shown).

In FIG. 2A, the left fork leg 12 includes a horizontal slot 22 on an inboard side of the left fork leg 12. The right fork leg 14 includes a horizontal slot 24 on an inboard side of the right fork leg 14. The horizontal slot 22 on the left fork leg 12 and the horizontal slot 24 on the right fork leg 14 are oriented in a forward direction. The horizontal slots 22, 24 mate with end caps 26, 28 that are positioned against opposing flat surfaces 58, 59 on each end of the non-rotating portion of the wheel hub assembly 16. The end caps 26, 28 are essentially discs or washers the help disperse the load from the wheel hub assembly 16 to the fork over a broader area. They also do not rely solely on shear to hold the hub in place, as they fit within the forwardly extending recesses or the horizontal slots 22, 24. The forward orientation of the horizontal slots 22, 24 counters the load placed upon the axle and hub by the brakes being applied to the brake discs. As the brakes are applied, the tire, wheel, and spokes pull the wheel hub assembly 16 rearward into the horizontal slots 22, 24. The resultant forces on the brake disc also pull the hub downwardly and/or rearward. In either case, the horizontal slots 22, 24 resist the forces and spread the load to the end caps 26, 28.

The wheel hub assembly 16 includes left spoke flange 17 and right spoke flange 18 for attaching the wheel spokes 13 (FIG. 1B) to the wheel hub assembly 16. The wheel hub assembly 16 further includes a disc brake flange 19 for attaching a brake disc 21 (FIG. 1B) to the disc brake flange 19 of FIG. 2A. In FIGS. 2A and 2B, located generally within the hub assembly 16 is a skewer rod assembly 30. Located outboard of the left fork leg 12 in FIGS. 2A and 2B is a quick-release (QR) assembly 60. In FIG. 2A, a left end cap 26 with opposing flat spots abuts the left end portion of the hub assembly 16 and is mounted in the horizontal slot 22 in the left fork leg. A right end cap 28 with opposing flat spots abuts the right end portion of the hub assembly 16 and is mounted in the right fork slot 14 as discussed above.

FIG. 2B is similar. Note that the slots in the fork legs accommodate longer axles 23 within inset recesses or slots 25. This form of the assembly can accommodate conversion of previous hub and axle assemblies to the improved arrangement with better handling of the braking forces.

Figure 3:
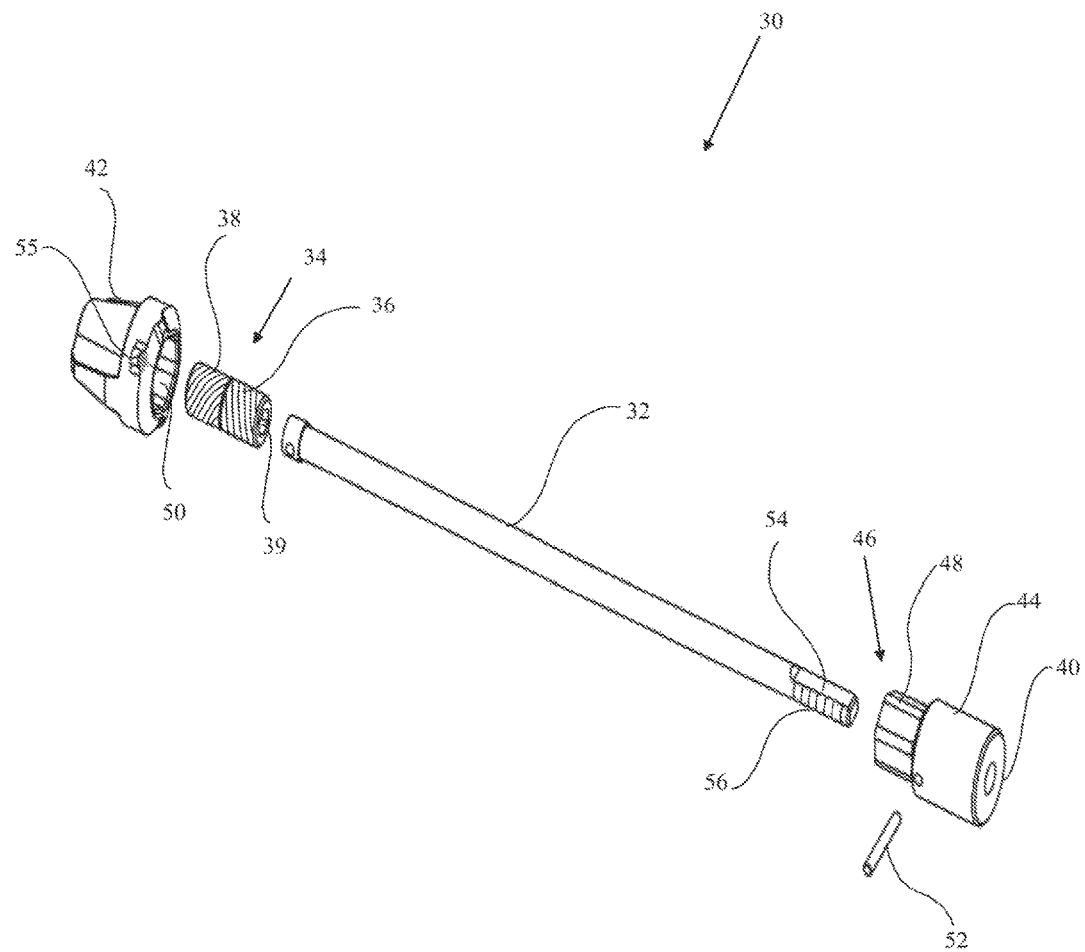
FIG. 3 illustrates an exploded isometric view of a skewer rod assembly according to an embodiment.

FIG. 3 illustrates an exploded isometric view of the skewer rod (i.e., tension rod) assembly 30 according to an embodiment of the present invention. As illustrated in FIG. 3, the skewer assembly 30 includes a skewer rod 32. The skewer rod 32 is installed through a through-hole in the left fork leg 12 and right fork leg 14 and within a through-hole in an axle of the wheel hub 16 (See also FIGS. 2A and 2B). In FIG. 3 an end of the skewer rod 32 that is installed proximal the right fork leg 14 of FIG. 2A, abuts against an adjusting cylinder 34. The adjusting cylinder 34 illustrated has external threads on an inboard portion 36 of the adjusting cylinder 34. The adjusting cylinder 34 has external threads on an outboard portion 38 of the adjusting cylinder 34. The threads on the inboard portion 36 and outboard portion 38 may be either left-handed, or right-handed. The external threads on the inboard portion 36 of the adjusting cylinder 34 allows the adjusting cylinder 34 to be threaded into a threaded bore in an outboard portion 46 of an adjusting sleeve 40. The external threads on the outboard portion 38 of the adjusting cylinder 34 allow the adjusting cylinder 34 to be threaded into a threaded bore on a thumbnut 42. A hex through-hole 39 in the adjusting cylinder 34 allows an Allen wrench (i.e., hex wrench) to be inserted through a hole in an outboard end of the thumbnut 42 into the hex hole 39 in the adjusting cylinder 34 to adjust the amount of thread engagement of the external threads on the inboard portion 36 of the adjusting cylinder 34 to the threaded bore in the outboard portion 46 of the adjusting sleeve 40. The adjusting cylinder 34 may be installed so that the inboard portion 36 and outboard portion 38 are reversed from the orientation shown in FIG. 3. The adjusting sleeve 40 has an inboard portion 44 in addition to the outboard portion 46. The inboard portion 44 of the adjusting sleeve fits inside the through-hole (FIG. 2) in the right fork leg 14. The outboard portion 46 of the adjusting sleeve 40 has an outer surface configured as wide and narrow flats 48. The wide and narrow flats 48 forming a hexagonal outer surface on the adjusting sleeve 40 outboard portion 46 fit into mating wide and narrow flats 50 forming a hexagonal inner surface of the thumbnut 42. Accordingly, when the thumbnut 42 is rotated, the adjusting sleeve 40 is also rotated. As illustrated in FIG. 3, a pin 52 secures the adjusting sleeve 40 to the skewer rod 32. Therefore, when the thumbnut 42 is rotated, the skewer rod 32 also rotates. The end of the skewer rod 32 opposite the thumbnut 42 in FIG. 3 has flats 54 on opposing sides of an outer surface of the end of the skewer rod 32. The same end of the skewer rod 32 in FIG. 3 also has threaded circumferential portions 56 on opposing sides of an outer surface of the end of the skewer rod 32. FIG. 3 also illustrates a protrusion 55 on an outer surface of the thumbnut 42.

Figure 4:
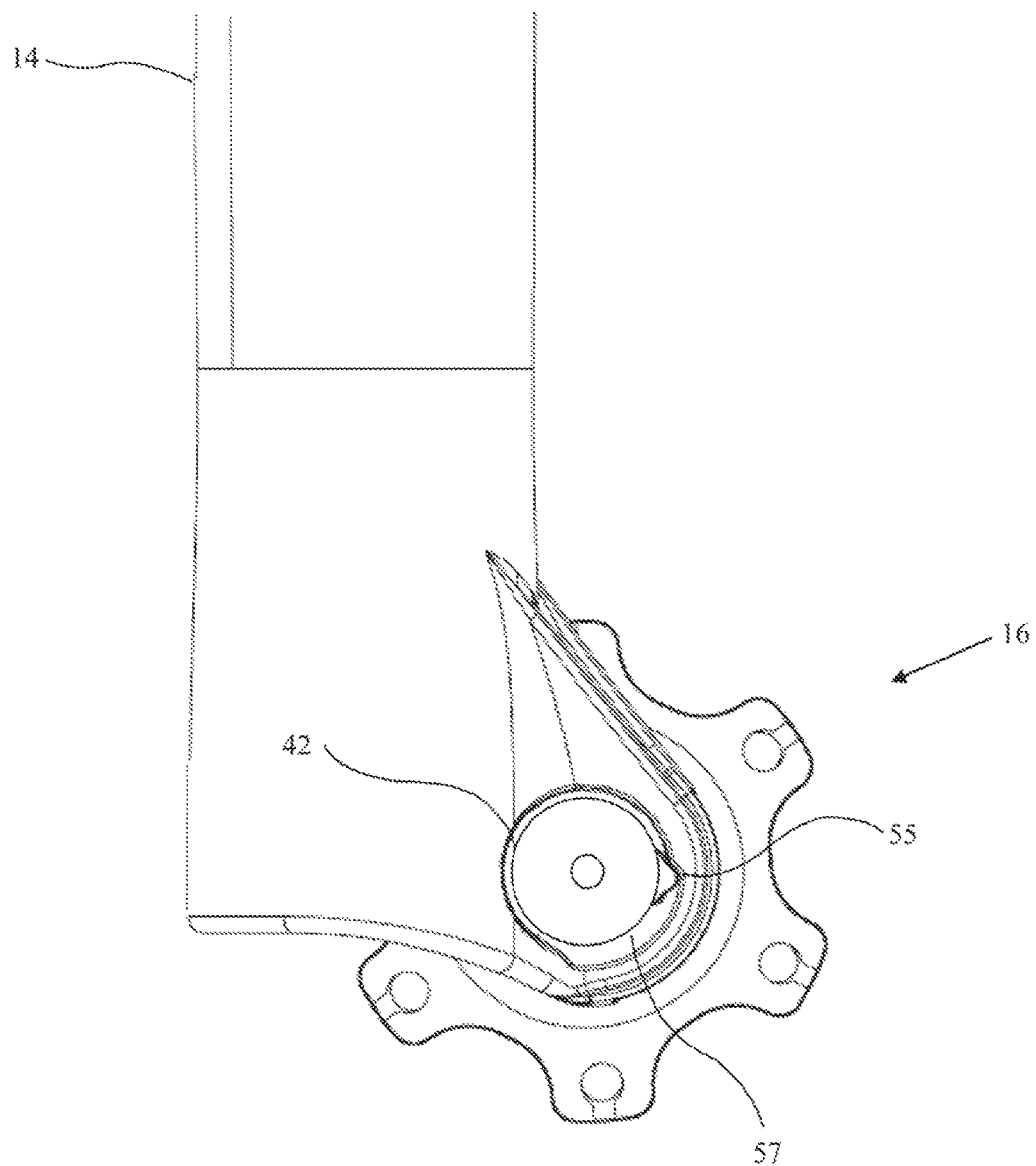
FIG. 4 illustrates a detail view of a lower portion of a right fork leg and a portion of a thumbnut looking inward according to an embodiment.

FIG. 4 illustrates a detail view of a lower portion of the right fork leg 14 and a portion of the thumbnut 42 looking inward according to an embodiment. As illustrated in FIG. 4, a protrusion 55 exists on an outer circumference of the thumbnut 42. As illustrated in FIG. 4, the protrusion 55 is located within a circumferential recess 57 on an outboard side of a lower portion of the right fork leg. The protrusion 55 on the outer circumference of the thumbnut 42 acts in cooperation with the circumferential recess 57 on the right fork leg to prevent the thumbnut 42 from being rotated more than a quarter turn in a preferred embodiment. The reason for not allowing the thumbnut 42 to turn more than a quarter turn will be explained further in the description of FIG. 5 below.

Figure 5:
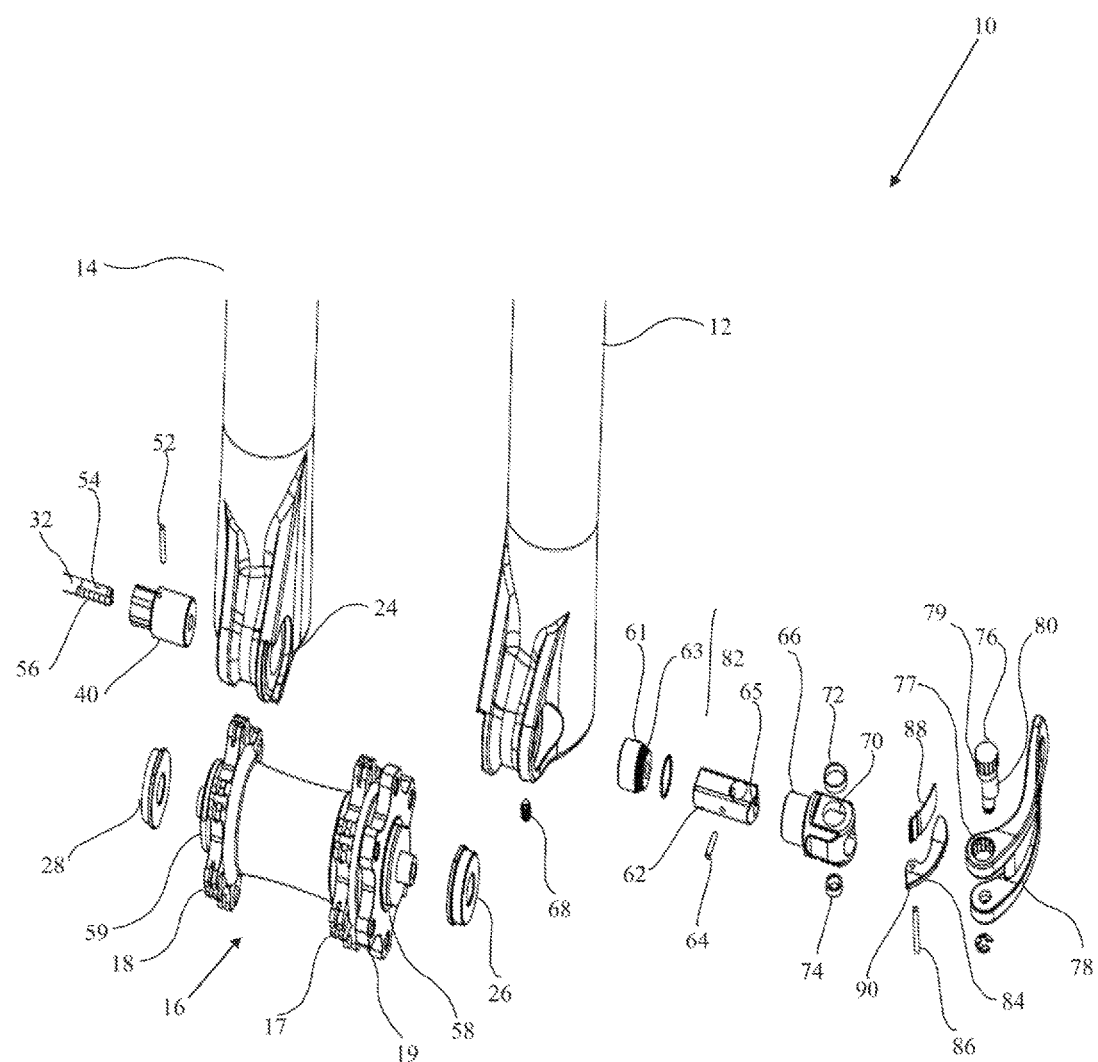
FIG. 5 illustrates an exploded isometric view of a quick-release assembly according to an embodiment.

FIG. 5 illustrates an exploded isometric view of the quick-release assembly 60 according to an embodiment. As illustrated in FIG. 5, the end of the skewer rod 32 in FIG. 3 (with flats 54 and threaded circumferential portions 56 on opposing sides of an outer surface of the skewer rod 32) engages a partially threaded bore in a partially internally threaded block 62. The end of the skewer rod 32 in FIG. 3 with flats 54 and threaded circumferential portions 56 is installed through a through-hole in the left fork bushing 61 into the partially threaded bore of the partially internally threaded block 62. The skewer rod 32 is oriented in the bore with the flats 54 of the skewer rod 32 aligned with the opposing threaded portions of the partially internally threaded block 62 such that it slides past the threaded bore portions without interference. A pin 64, inserted into the partially internally threaded block 62 and that protrudes into the bore, acts as a stop to allow the end of the skewer rod 32 to be inserted into a proper depth of partially threaded bore of the partially internally threaded block 62. This proper depth insertion of the skewer rod 32 assures that the quick-release skewer assembly 10 is properly clamped to the left fork leg 12 and the right fork leg 14.

Rotating the thumbnut 42 (see also FIG. 4) and attached skewer rod 32 causes the threaded circumferential portions 56 on the skewer rod 32 to threadably engage the opposing threaded portions of the partially internally threaded block 62. As also illustrated in FIG. 5, the partially internally threaded block 62 is matingly housed within a hole 65 in the housing 66. The partially internally threaded block 62 is free to move axially within the hole 65 of the partially internally threaded cylinder housing 66. However, the block 62 cannot rotate axially within the housing 66 as the square cross section of the block 62 mates with the internally square hole 65. An outboard threaded land 63 on the left fork bushing 61 threads into a threaded portion of an inboard portion of the hole 65 in the housing 66. A setscrew 68 prevents relative motion between the housing 66 and the left fork leg 12 by the setscrew threading into the left fork leg 12 and the left fork bushing 61.

FIG. 5 also illustrates the housing 66 has a vertical through-bore 70 in which upper 72 and lower 74 bushings are installed and in which a camshaft 76 rotates. The camshaft 76 is inserted through a serrated hole 77 in a quick-release (QR) lever 78. A serrated land 79 on a top portion of the camshaft 76 engages the serrated hole 77 in the QR lever. The serrated land 79 engagement with the serrated hole 77 in the QR lever 78 causes the camshaft 76 to rotate when the QR lever 78 is operated. A cam 80 on the camshaft 76 rides in a hole 82 in the partially internally threaded block 62. In operation, when the QR lever 78 is operated, the cam 80 is caused to rotate about the upper 72 and lower 74 bushings installed in the housing 66. This rotation of the cam 80 in the hole 82 in the partially internally threaded block 62 causes the partially internally threaded block 62 to follow the cam 80 rotational movement. The cam 80 rotational movement causes the block 62 to move in an axial direction. As the outer surface of the right side of the skewer rod 32 is threadably engaged to the opposing threaded portions of the partially internally threaded block 62, the skewer rod 32 is also caused to move axially. This axial movement of the skewer rod 32 causes a clamping force of the skewer rod assembly 30 of FIG. 3 and QR assembly 60 to the left fork legs 12 and right fork legs 14 to be selectively applied and relieved. A QR locking lever 84 is pivotally mounted on a QR locking lever pin 86. A pointed end 90 of the QR locking lever 84 is biased against the housing 66 by a leaf spring 88. The biasing of pointed end 90 of the QR locking lever 84 against the housing 66 by the leaf spring 88 prevents the QR lever 78 from being operated if the locking lever 84 is not depressed. By operating the QR locking lever, the pointed end 90 of the QR locking lever 84 is no longer in contact with the housing 66 and the QR lever 78 is free to be operated. This locking lever 84 functions as a backup safety feature. The locking lever 84 may be omitted in some embodiments such that the cam action is relied upon to retain the QR lever in the closed configuration.

Figure 6:
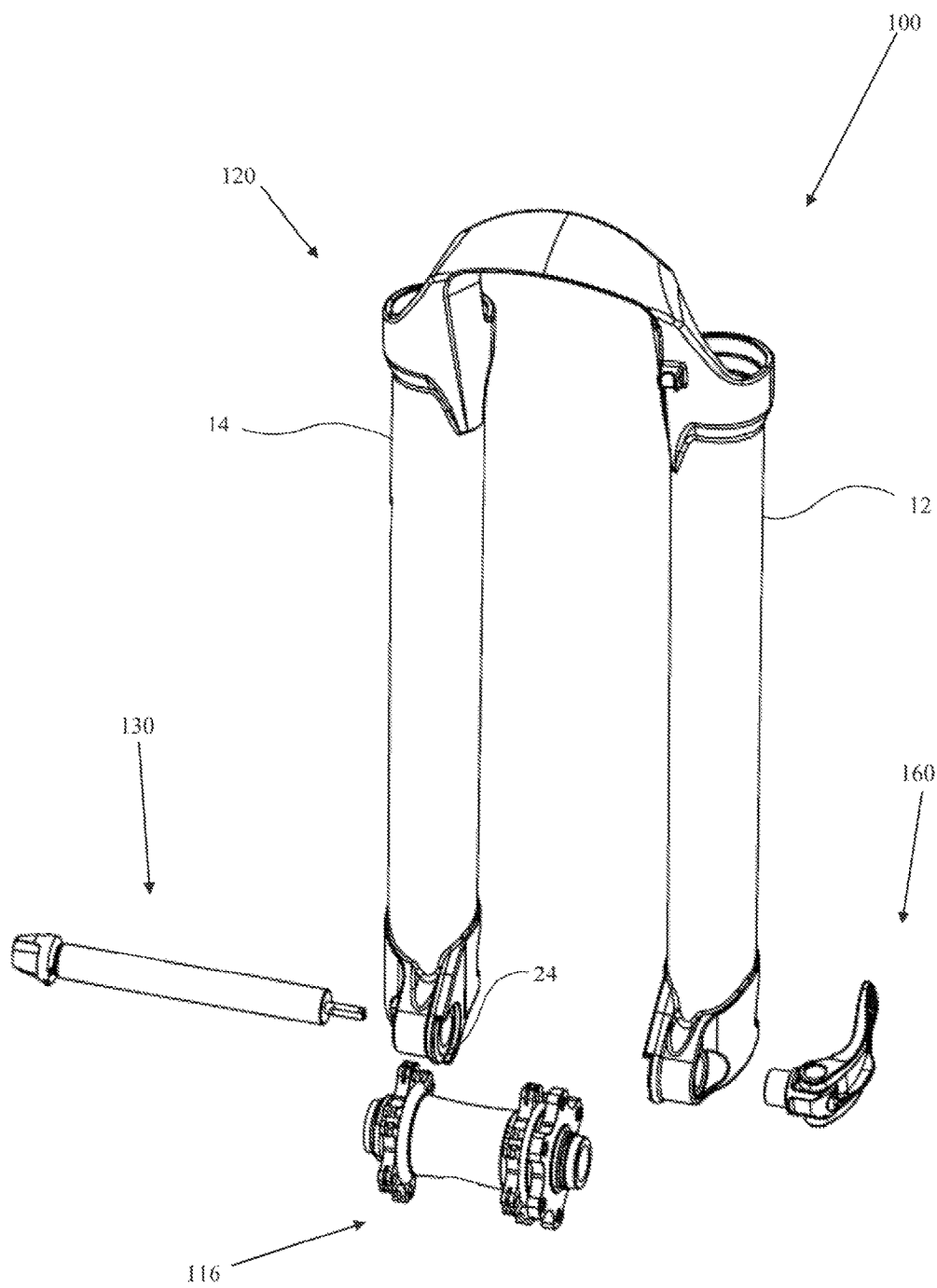
FIG. 6 illustrates an isometric view of a quick-release skewer assembly removed from the forks and hub adjacent the front fork of a bicycle according to another embodiment.
Figure 7:
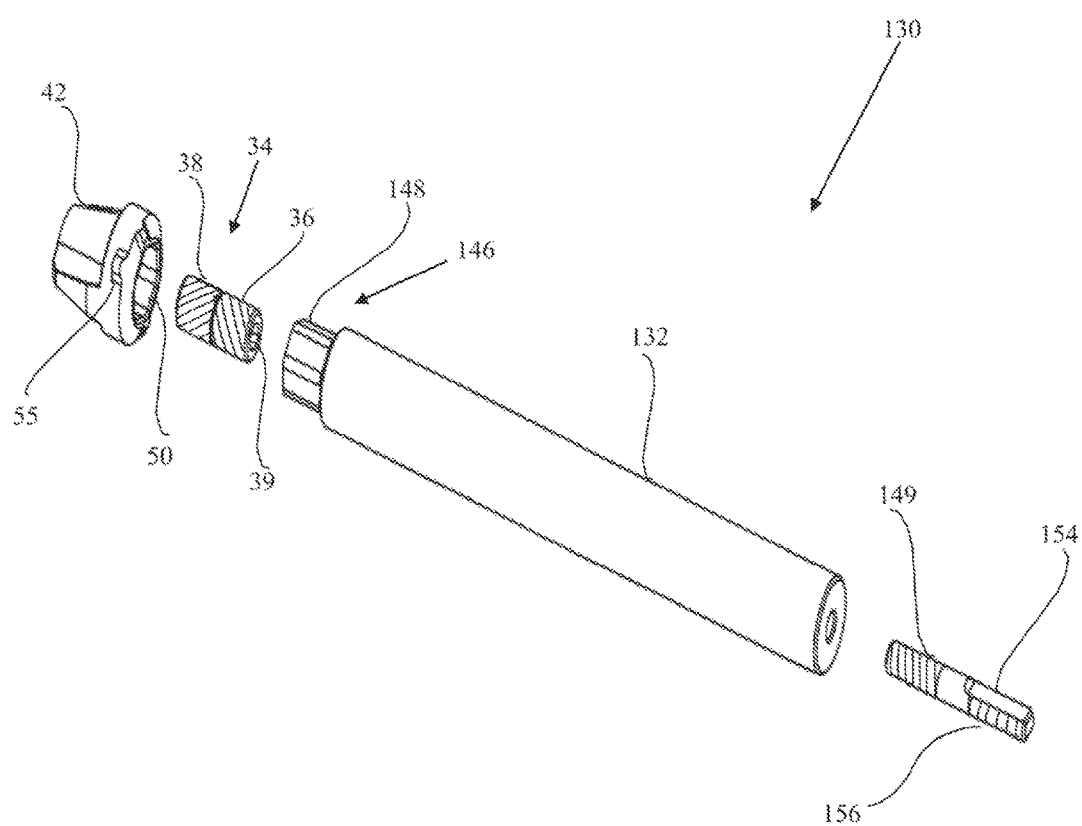
FIG. 7 illustrates an exploded isometric view of the skewer rod assembly according to an embodiment.

FIG. 6 illustrates an isometric view of a quick-release skewer assembly 100 looking toward a rear direction of a bicycle according to another embodiment. The quick-release skewer assembly 100 of FIGS. 6-8 is primarily intended for hub assemblies 116 with a 15 mm axle, but the embodiments of FIGS. 6-8 are not limited to this size axle. The description of the quick-release skewer assembly 100 of FIG. 6 is the same, for the most part as FIG. 2A, so parts that are the same as described in FIG. 2 will not be described again. The main difference between the quick-release skewer assembly 10 of FIG. 2A and the quick-release skewer assembly 100 of FIG. 6 is that the quick-release skewer assembly 100 of FIG. 6 does not utilize the left end cap 26 and right end cap 28 as illustrated in FIG. 2A. This is due to the fact that since the quick-release skewer assembly 100 of FIG. 6 utilizes a larger axle, the larger axle distributes transmitted forces to the left 12 and right 14 fork legs over a larger area, hence there is no need for the left 26 and right 28 end caps that are used in FIG. 2A to distribute forces over a larger area from the smaller axle of FIG. 2A. Also, as described below in the description of FIG. 7, the skewer rod assembly 130 of the embodiment of FIG. 7 has some differences in design from the skewer rod assembly 30 of the embodiment of FIG. 3. FIG. 6 also illustrates the fork assembly 120 and the quick-release assembly 160.

FIG. 7 illustrates an exploded isometric view of the skewer rod assembly 130 according to an embodiment. In FIG. 7, parts that are the same as in FIG. 3 will not be again described, unless they are attached to a part that is different from FIG. 3. In addition, parts in FIG. 7 that are the same as in FIG. 3 will utilize the same reference number. As illustrated in FIG. 7, the skewer assembly 130 includes a skewer rod 132. The skewer rod 132 is installed through a through-hole in an axle of the wheel hub 116. In FIG. 7 an end of the skewer rod 132 that is installed proximal to the right fork leg 14 of FIG. 6 abuts against an adjusting cylinder 34. The adjusting cylinder 34 illustrated has external threads on an inboard portion 36 of the adjusting cylinder 34. The adjusting cylinder 34 has external threads on an outboard portion 38 of the adjusting cylinder 34. The threads on the inboard portion 36 and outboard portion 38 may be either left-handed, or right-handed. The external threads on the inboard portion 36 of the adjusting cylinder 34 allows the adjusting cylinder 34 to be threaded into a threaded bore in the skewer rod 132. The external threads on the outboard portion 38 of the adjusting cylinder allows the adjusting cylinder 34 to be threaded into a threaded bore on a thumbnut 42. A hex through-hole 39 in the adjusting cylinder 34 allows an Allen wrench to be inserted into the hex hole 39 through a hole in an end of the thumbnut 42 to adjust the amount of thread engagement of the external threads on the inboard portion 36 of the adjusting cylinder 34 to the threaded bore in the skewer rod 132, thus adjusting the relative position of the rod 132 to the thumbnut 42. The adjusting cylinder 34 may be installed so that the inboard portion 36 and outboard portion 38 are reversed to the orientation shown in FIG. 7. An outboard portion 146 of the skewer rod 132 proximal to the right fork leg 14 of FIG. 6 has an outer surface configured as wide and narrow flats 148. The wide and narrow flats 148 on an outer surface of the skewer rod 132 outboard portion 146 fit into mating wide and narrow flats 50 on an inner surface of the thumbnut 42. Accordingly, when the thumbnut 42 is rotated, the skewer rod 132 is also rotated. A threaded shaft 149 is threadably engaged into a threaded bore on the end of the skewer rod 132 in FIG. 7. As also illustrated in FIG. 7, the end of the threaded shaft 149 has flats 154 on opposing sides of an outer surface of the end of the threaded shaft 149. The end of the threaded shaft 149 in FIG. 7 also has threaded circumferential portions 156 on opposing sides of its outer surface. FIG. 7 also illustrates a protrusion 55 on an outer surface of the thumbnut 42 as also described and shown for FIG. 3.

Figure 8A:
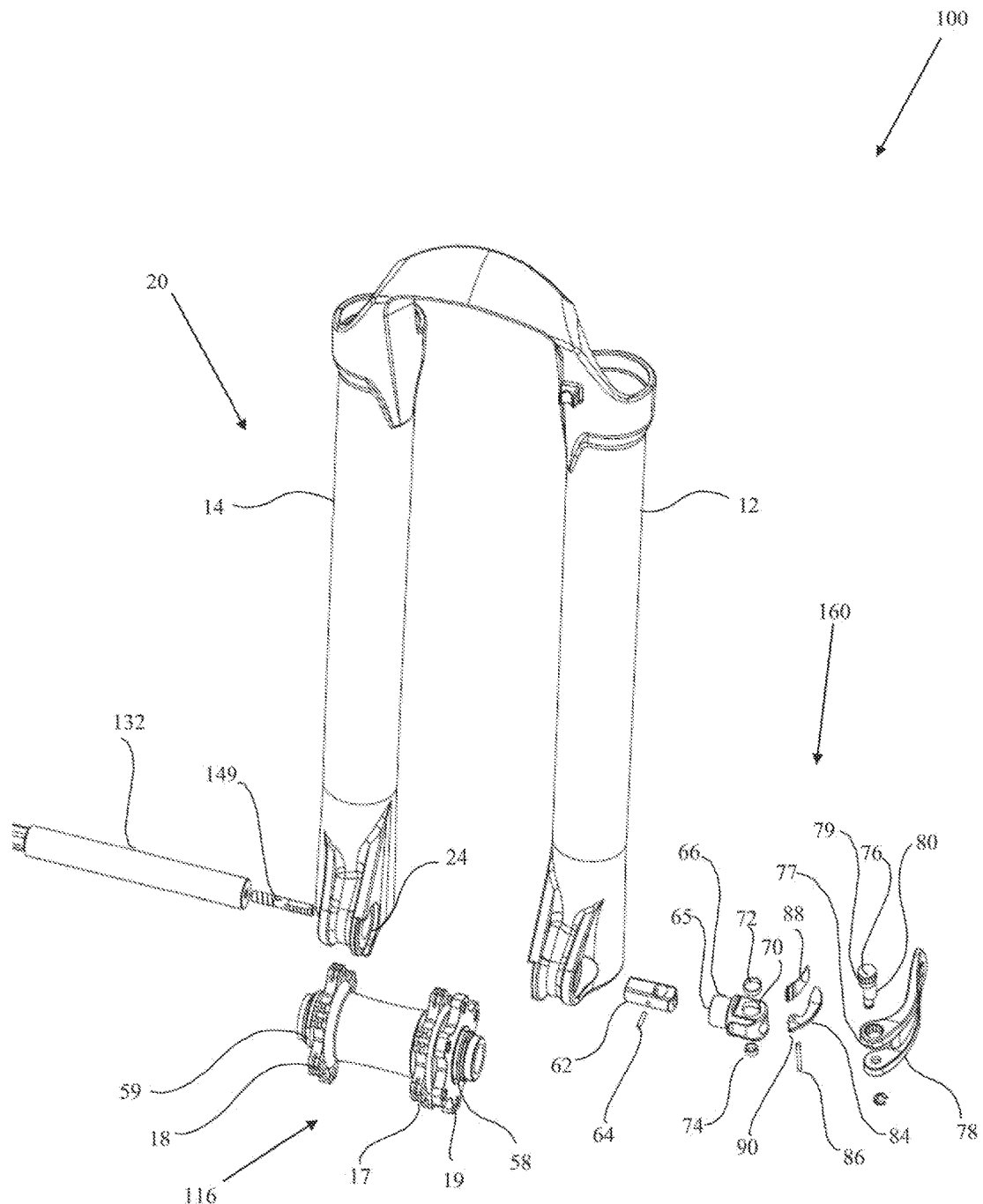
FIG. 8A illustrates an exploded isometric view of the quick-release assembly according to an embodiment with a 15 mm axle.

FIG. 8A illustrates an exploded isometric view of the quick-release assembly 160 according to an embodiment. The description of the quick-release assembly 160 is virtually identical to FIG. 5, so the parts of the quick-release assembly 60 of FIG. 5 that are the same in FIG. 8A will not be described again. The only difference between the quick-release assembly 60 of FIG. 5 and the quick-release assembly 160 of FIG. 8A is that a threaded smaller shaft 149 threadably engages the partially internally threaded block 62, instead of the skewer shaft 132 directly threadably engaging the partially internally threaded block 62, as was taught by FIG. 5. In FIG. 7, the protrusion 55 on the thumbnut 42, which is located within the circumferential recess 77 of FIG. 8A on the right fork leg 14 as taught by FIG. 4, also applies to the embodiment of FIGS. 6-8. FIG. 8A also illustrates, in exploded perspective view, elements of the fork assembly 20 in combination including the left fork leg 12, the right fork leg 14, the horizontal slot 24 on the right fork leg 14, the left spoke flange 17, the right spoke flange 18, disc brake flange 19, opposing flat surfaces 58 59, of the wheel hub 116, and the skewer rod 132. In addition, FIG. 8A illustrates quick release assembly 160 including the pin 64, the hole 65 at the end of the partially threaded cylinder housing 66, vertical through-hole 70 in the partially threaded cylinder housing 66, locking lever 84, pointed end 90 of the locking lever 84, leaf spring 88, QR locking lever pin 86, camshaft 76, upper bushing 72, lower bushing 74, serrated land 79, cam 80, and lever 78.

Figure 8B:
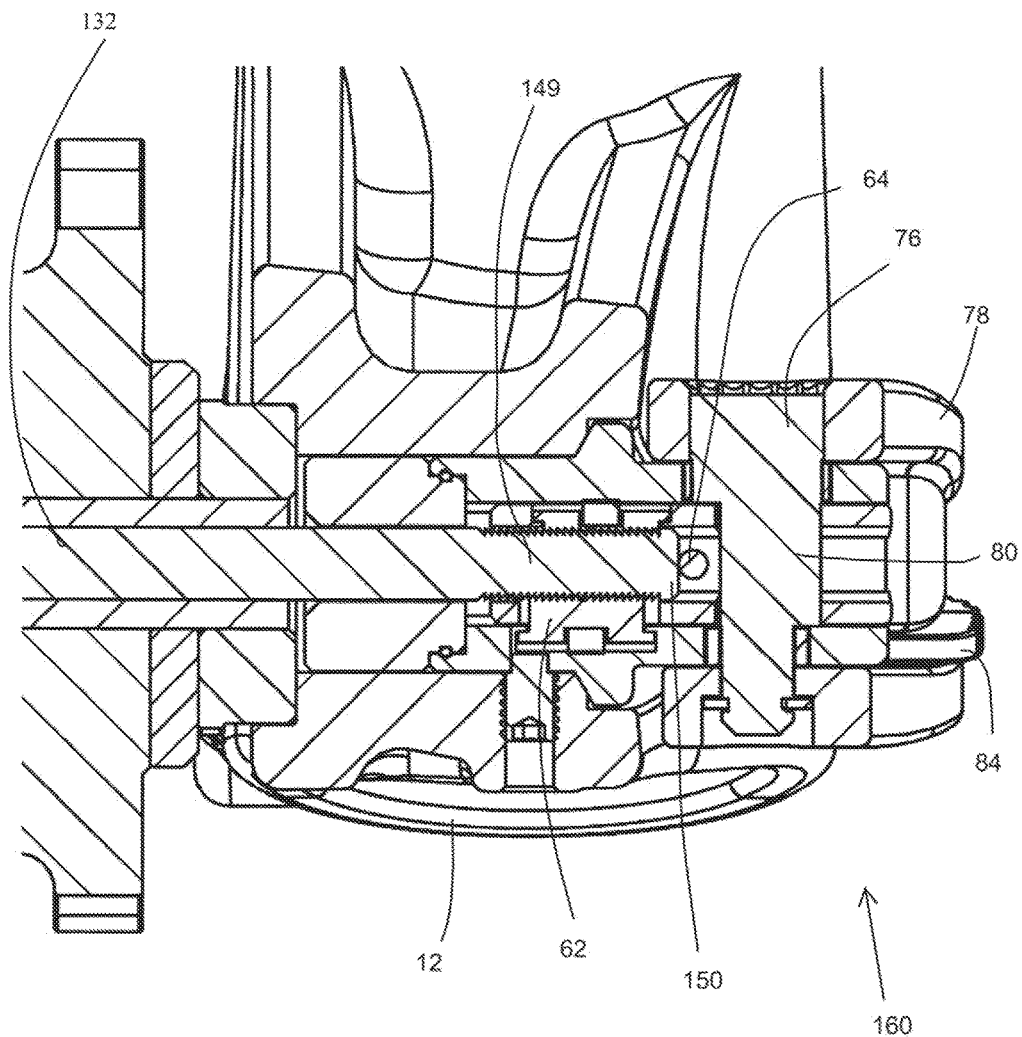
FIG. 8B is a close-up cross-sectional view of the QR assembly securing the end of a tensioning rod.

FIG. 8B shows the parts in a close-up cross-sectional view of the attachment of the tension rod (skewer rod 132) to the second embodiment of the QR assembly 160. Note that the end of the threaded shaft 149 of the skewer rod 132 includes a non-threaded head 150. This head helps ensure that the skewer rod 132 is inserted all the way. The rod will not turn relative to the QR assembly 160 if the head does not extend past the complementary threads in the threaded cylinder 62. Thus, upon insertion, the end of the rod 132 abuts pin 64. At this point, head 150 clears the threads of the cylinder 62 such that the rod can be turned a partial turn (preferably a quarter turn) to engage the treads. FIG. 8B also illustrates the left fork leg 12, the camshaft 76, the lever 78, the cam 80, and the locking lever 84.

Figure 8E:
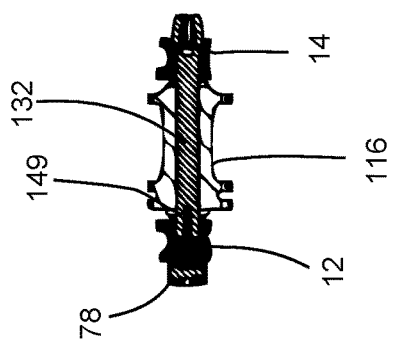
FIG. 8E illustrates a sectional view of FIG. 8D taken along section lines 8E-8E.
Figure 8D:
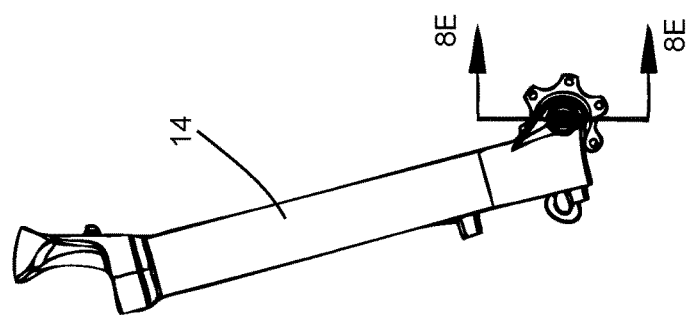
FIG. 8D illustrates a side view of the assembly of FIG. 8C.
Figure 8C:
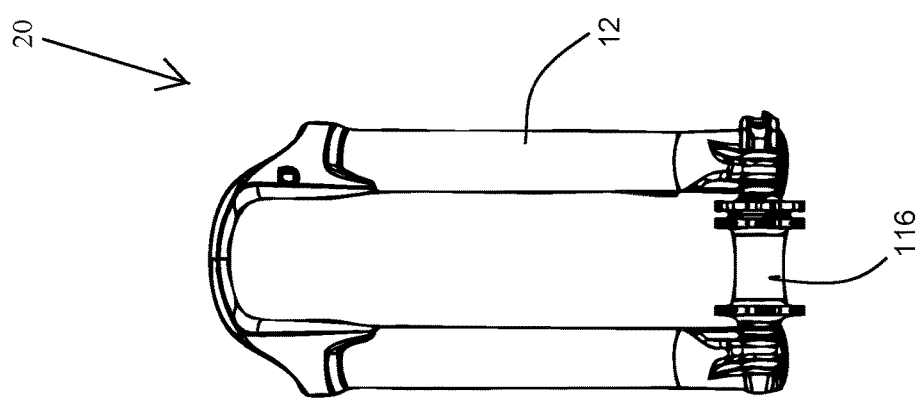
FIG. 8C illustrates a front view of the assembly and cross-section of an embodiment with a 15 mm axle.

FIG. 8C through 8E illustrate the general assembly of FIGS. 8A and B in an assembled configuration in the fork and hub. FIG. 8A illustrates a front view of the fork assembly 20 calling out the hub assembly 116 and the left fork leg 12. FIG. 8D is a side view of FIG. 8C illustrating the right fork leg 14. FIG. 8E is a sectional view of FIG. 8D taken across section lines 8E-8E. FIG. 8E illustrates the left fork leg 12, the right fork leg 14, the lever 78, the skewer rod 132, and the threaded shaft 149.

Figure 9:
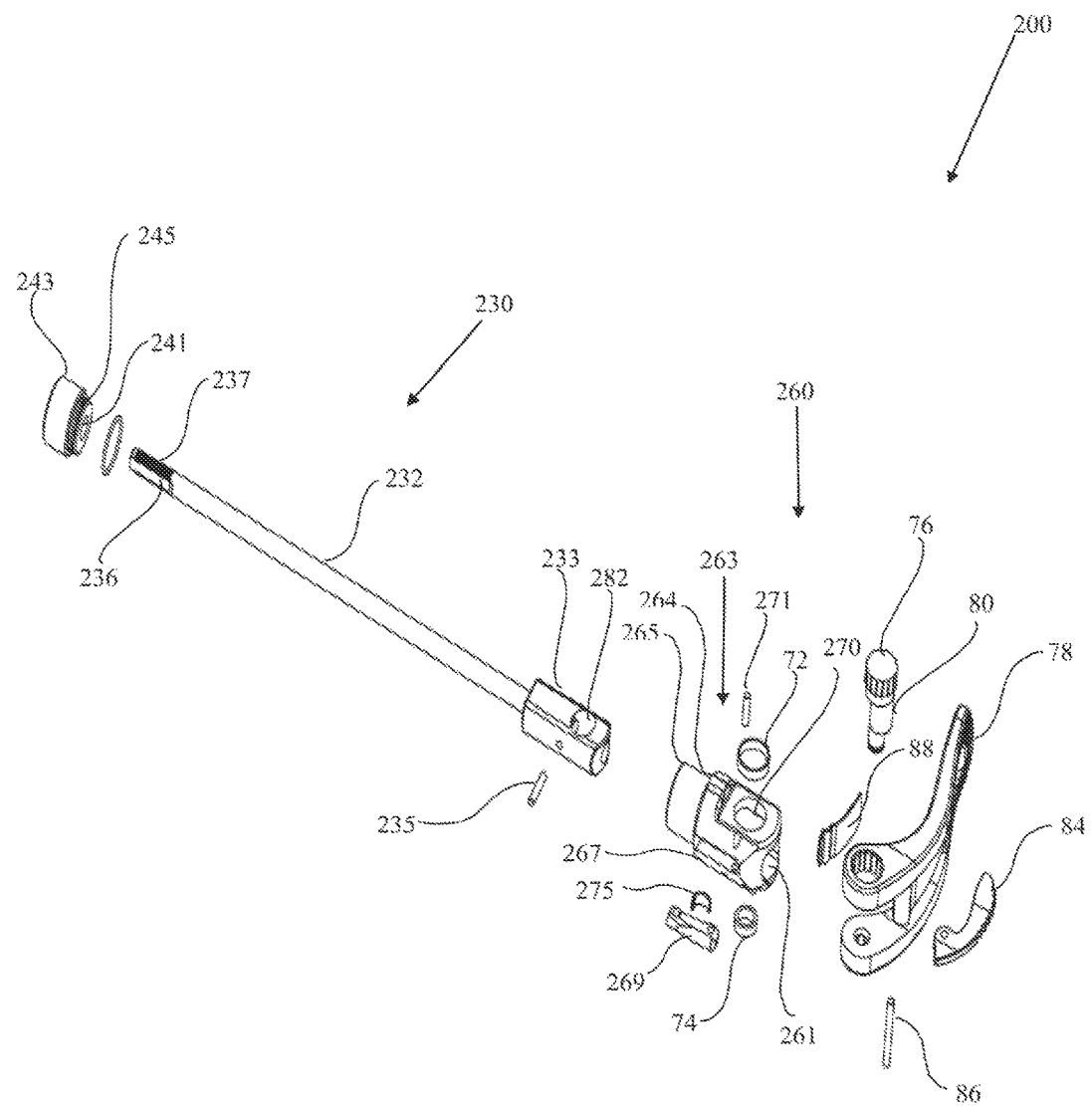
FIG. 9 illustrates an isometric view of a quick-release skewer assembly according to another embodiment in which the tensioning rod is fastened to the QR lever.

FIG. 9 illustrates an isometric view of a quick-release (QR) skewer assembly 200 according to another embodiment. The quick-release skewer assembly 200 of FIGS. 9 and 10A-C is for an embodiment in which the QR assembly 260 is removed with the skewer assembly 230 of FIG. 9 through the left fork leg 12 of FIGS. 10A-10C to allow the bicycle wheel removal. This is in contrast to the embodiments of FIGS. 2-5 and 6-8 in which the skewer assembly 30 of FIGS. 2-5 and the skewer assembly 130 of FIGS. 6-8 are removed through the right fork leg 14 with the thumbnut 42.

As illustrated in FIG. 9, a skewer assembly 230 of a QR skewer assembly 200 includes a skewer rod 232. A rectangular-shaped cam follower 233 is attached to the end of the skewer rod 232 by a pin 235. On the opposite end of the skewer rod 232 is located an end portion with opposing flats 236 and opposing circumferential threaded portions 237. The opposing flat 236 and circumferentially threaded portions 237 on the end portion of the skewer rod 232 in FIG. 9 are selectively engageable to opposing threaded portions in the thumbnut situated on the outer side of the right fork (not shown).

FIG. 9 also illustrates the quick-release assembly 260 according to an embodiment. The description of the quick-release assembly 260 illustrated in FIG. 9 is the same in many respects to the quick-release assembly 60 of FIG. 5, so the parts that are described in FIG. 5 and are the same in FIG. 9 will generally not be described again. As illustrated in FIG. 9, the rectangular-shaped cam follower 233 attached to the end of the skewer rod 232 by pin 235 fits into a rectangular-shaped hole 261 in a cam follower housing 263. The cam follower housing 263 includes a round inboard portion 265 and a rectangular outboard portion 267. The round inboard portion 265, along with the end cap 243 threaded thereto, is installed within a bore on the right fork bushing 243. A lever 269 is mounted by a pin 271 into a groove 273 in a side of the rectangular outboard portion 267 of the cam follower housing 263. A spring 275 biases the lever 269 outward. The lever 269 is biased into a groove in the left fork leg 12 of FIGS. 10A-C to retain the cam follower housing 263 to the groove in the left fork leg 12. A protrusion 264 on an outer surface of the cam follower housing 263 is located within a circumferential recess 283 (FIG. 10A) in the left fork leg 12. The cam follower housing 263 has a through-bore 270 in which upper bushing 72 and lower bushing 74 are installed and in which a camshaft 76 rides. A cam 80 on the camshaft 76 rides in a hole 282 in the rectangular-shaped cam follower 233. In operation, when the QR lever 78 is operated, the cam 80 is caused to rotate about the upper bushing 72 and lower bushing 74 installed in the cam follower housing 263. This rotation of the cam 80 causes the rectangular-shaped cam follower 233 to follow the cam 80 rotational movement. The cam 80 rotational movement causes the cam follower 233 and attached skewer rod 232 to move in an axial direction. This axial movement of the skewer rod 232 causes a clamping force of the skewer rod assembly 230 and QR assembly to the left fork leg 12 and the right fork leg 14 of FIGS. 10A-C to be selectively applied and relieved.

Figure 10A:
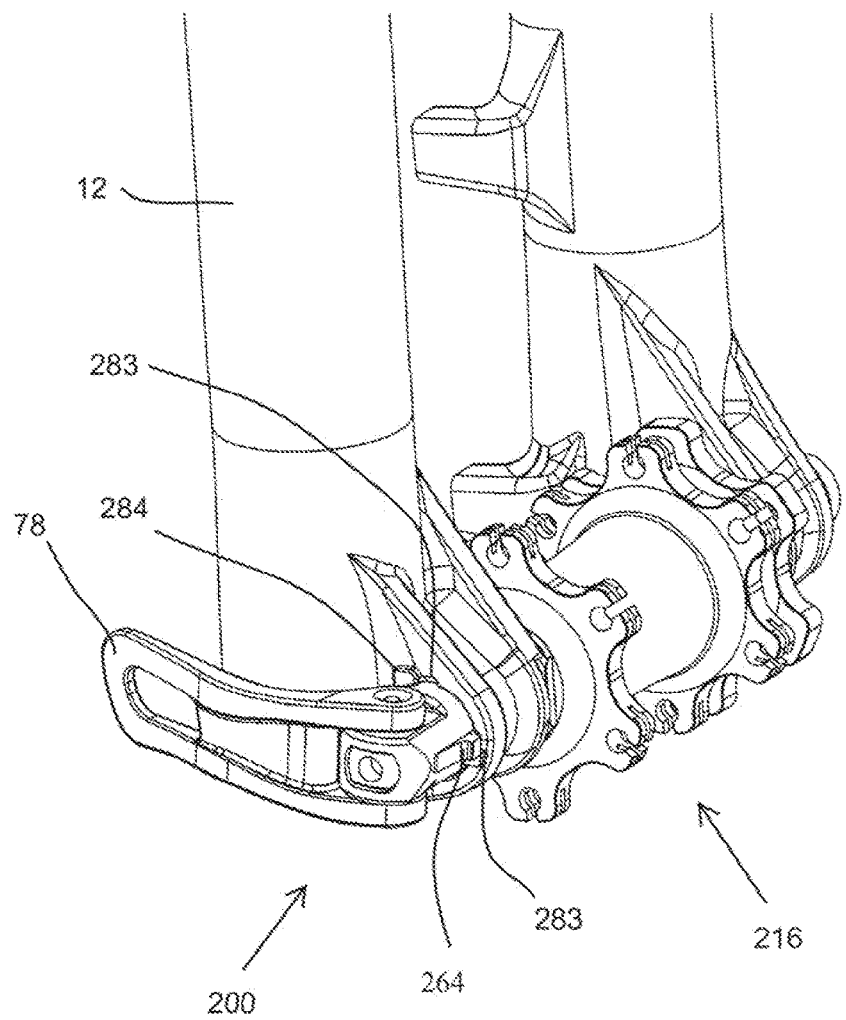
FIG. 10A illustrates the quick-release lever in a closed orientation according to an embodiment.

FIG. 10A illustrates the QR lever 78 in the closed position with a clamping force applied by the QR skewer assembly 200. FIG. 10A also illustrates the outwardly biased protrusion 264 on the cam follower housing and the recesses 283 into which the protrusion drops to stop excessive rotation of the QR lever 78. Alternatively, a recess along the circumferential region of the desired turn of the QR lever 78 may be used along with a tab or nub on the QR housing is used. A stop tab 284 is also used to positively locate the end of the lever turn. FIG. 10A also illustrates the hub assembly 216 in combination with the other described elements.

Figure 10B:
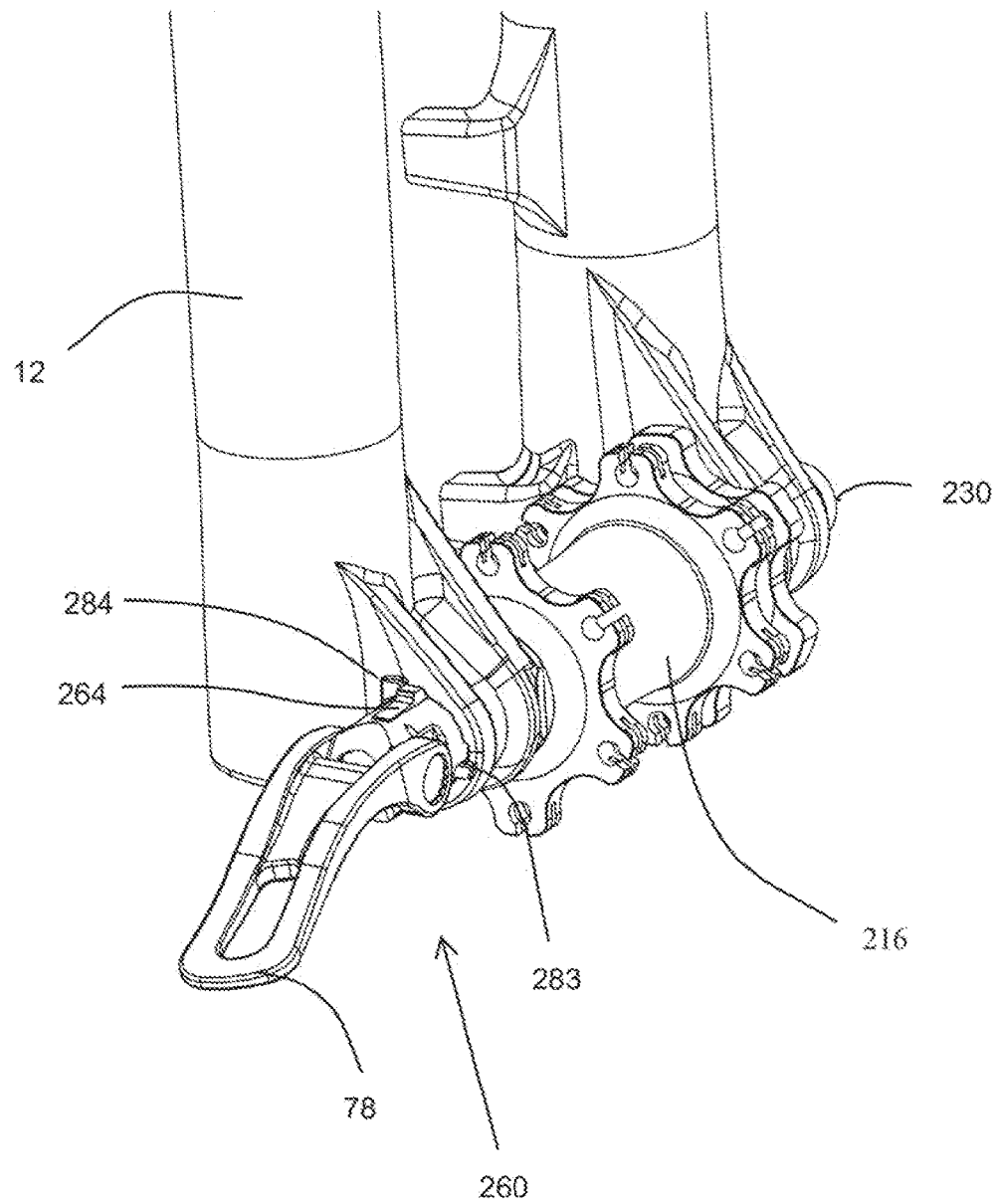
FIG. 10B illustrates the quick-release lever in an open orientation according to an embodiment.
Figure 10C:
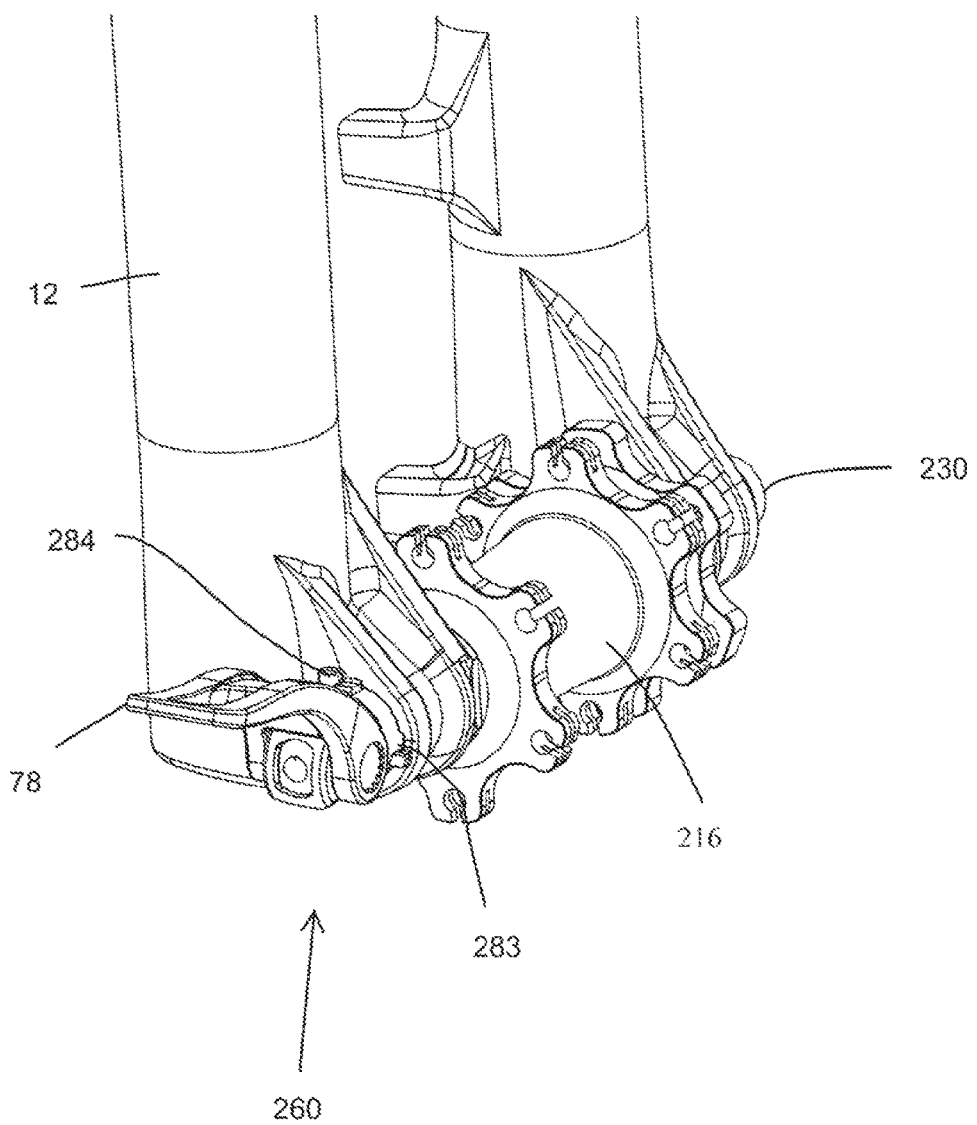
FIG. 10C illustrates the quick-release lever in release orientation according to an embodiment.

FIG. 10B illustrates the QR lever 78 in the open position with the clamping force applied by the QR skewer assembly 200 relieved. Once the clamping force is relieved, the QR assembly 260 and the skewer assembly 230 may be rotated 90 degrees so the QR lever 78 is oriented vertically as illustrated in FIG. 10C. Once the QR assembly 260 and the skewer assembly 230 is rotated 90 degrees, the skewer rod 232 opposing flat 236 and circumferentially threaded portions 237 of FIG. 9 are aligned so that the opposing circumferentially threaded portions are not engaged with the opposing threaded portions in the bore 241 on the right fork bushing 243 (FIG. 9). In this orientation, the skewer assembly 230 and the QR assembly 260 may be removed from the hub assembly 216 and the wheel may be removed from the bicycle.

In use of the embodiments of FIGS. 2-5, a user operates the QR lever 78 of FIG. 5 from a closed position, in which a clamping force is applied by the QR skewer assembly 10 (FIGS. 2A and 5) to the left fork leg 12 and right fork leg 14 in order to retain the QR shaft assembly and the wheel 11 (FIG. 1A) to the left fork leg 12 and right fork leg 14, to an open position, in which the clamping force is relieved. Once the clamping force is relieved, the thumbnut 42 (FIG. 3) is rotated 90 degrees in order to disengage the threaded circumferential portions 56 (FIGS. 3 and 5) on opposing parts of an outer surface of the right side of the skewer rod 32 (FIGS. 3 and 5) from the opposing threaded portions in the partially internally threaded hole in the partially internally threaded block 62 (FIG. 5). Once the opposing threaded portions in the skewer rod 32 and the partially internally threaded block 62 are disengaged, the threaded nut 42 and the skewer rod assembly 30 may be removed from the hub assembly 16. Once the threaded nut 42 and the skewer rod assembly 30 are removed, the wheel 11 may then be removed from the left fork leg 12 and right fork leg 14. Reinstallation of the wheel is the reverse of the above.

The protrusion 55 on the thumbnut 42 (both in FIG. 3), which moves within the circumferential recess 57 in a lower outboard portion of the right fork leg 14 (both in FIG. 4), prevents the thumbnut 42 from being rotated more than 90 degrees in order to assure that the skewer rod 32 flats 54 are aligned with the threaded portion in the partially internally threaded block 62 (FIG. 5). This alignment allows the skewer rod 32 to be removed from the partially internally threaded block 62. Reinstallation of the wheel 11 from FIG. 1A is the reverse of the above.

Referring to FIG. 3, in order to assure a proper clamping force of the QR skewer assembly 10 to the left fork leg 12 and right fork leg 14 (both in FIG. 5), an Allen wrench may be inserted through a hole in an end of the thumbnut 42. The Allen wrench engages the hex through-hole 39 in the adjusting cylinder 34. By turning the Allen wrench engaged in the hex through-hole 39 in the adjusting cylinder 34, the distance along a longitudinal axis of the adjusting cylinder 34 between the thumbnut 42, which clamps to the right fork leg 14 and the partially internally threaded cylinder housing 66, which clamps to the left fork leg 12 may be increased, to decrease the clamping force, or decreased, to increase the clamping force.

The embodiment of FIGS. 6-8 operates in a similar manner. One difference of the embodiment of FIGS. 6-8 with the embodiment of FIGS. 2-5 is that the embodiment of FIGS. 6-8 does not utilize an adjusting sleeve 40 (FIG. 3) in the skewer assembly 30. Instead, the function of the adjusting sleeve 40 of FIG. 3 has been incorporated into the skewer rod 132 of FIG. 7 in the embodiment of FIGS. 6-8. The other difference between the embodiment of FIGS. 2-5 and 6-8 is that the opposing flats 54 and threaded circumferential 56 portions on the right side of the skewer rod in FIG. 3 have been replaced in FIG. 7 with a separate threaded shaft 149 with opposing flats 154 and threaded circumferential 156 portions that mate into the partially internally threaded block 62 of FIG. 8A.

In use of the embodiments of FIGS. 9 and 10, a user operates the QR lever 78 from a closed position (FIG. 10A), in which a clamping force is applied by the QR skewer assembly 200 to the left fork leg 12 and right fork leg 14 in order to retain the QR skewer assembly 200 and the wheel 11 to the left fork leg 12 and right fork leg 14, to an open position (FIG. 10B), in which the clamping force is relieved. Once the clamping force is relieved, the QR lever 78 is rotated 90 degrees (FIG. 10C) in order to disengage the threaded circumferential portions 237 on opposing parts of the skewer rod 232 in FIG. 9 from the opposing threaded portions in the bore 241 on the right fork bushing 243. Once the opposing threaded portions 237 on the skewer rod 232 and in the bore 241 on the right fork bushing 243 are disengaged, the QR lever 78 and the skewer rod assembly 230 may be pulled-out of the hub assembly 16 and the left fork leg 12 and the right fork leg 14. Once the QR lever 78 and the skewer rod assembly 230 are removed, the wheel 11 of FIG. 1A may be removed from the left fork leg 12 and the right fork leg 14. Reinstallation of the wheel is the reverse of the above.

In FIG. 9, protrusion 264 on the cam follower housing 263, which moves within the circumferential recess 283 in the left fork leg 12, both in FIG. 10A, prevents the QR lever 78 from being rotated more than 90 degrees in order to assure that the opposing flats 236 on skewer rod 232 is aligned with the opposing circumferential threaded portions in the bore 241 in the right fork bushing 243 so the skewer rod 232 may be removed from the right fork bushing 243. Reinstallation of the wheel 11 is the reverse of the above.

In order to assure a proper clamping force of the QR skewer assembly 200 to the left fork leg 12 and right fork leg 14, both of FIG. 10A, the length of thread engagement of the partial circumferential threaded portions 237 on the skewer rod 232 and the partially threaded portions in the bore 241 of the right fork bushing 243 may be varied. By varying this length of thread engagement, the distance between the right fork bushing 243, which clamps to the right fork leg 14 and the cam follower housing 263, which clamps to the left fork leg 12 may be increased, to decrease the clamping force, or decreased, to increase the clamping force.

Figure 11A:
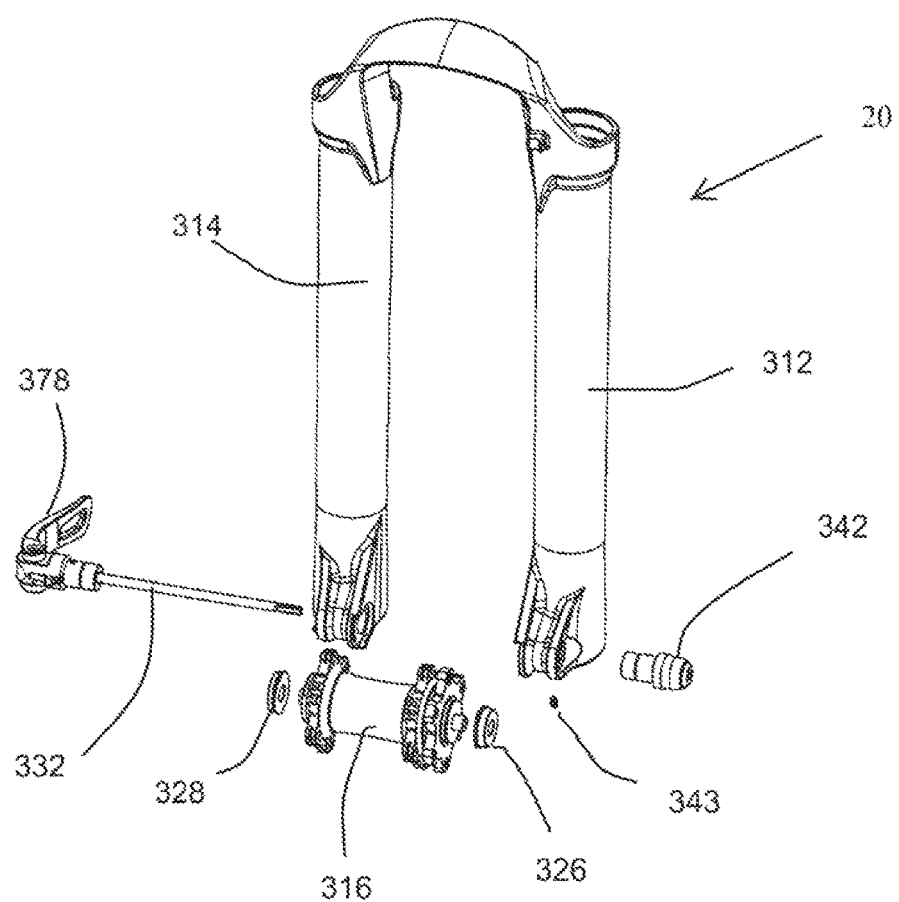
FIG. 11A illustrates another embodiment in a partially exploded view.

FIGS. 11A and B illustrate an alternate embodiment of the QR tension rod assembly of the present invention. In this embodiment, the tension rod 332 is fixed to the QR lever 378. A separate fixed nut 342 is fixed within the fork leg (preferably the left leg 312) and held in place with a setscrew 343 that is fastened through the bottom of the fork leg into the bottom of the nut 342. The QR/tension rod assembly is removed together as it is separated from the fixed nut 342 by a method like that discussed above with regard to FIGS. 10A, B, and C.

Figure 11B:
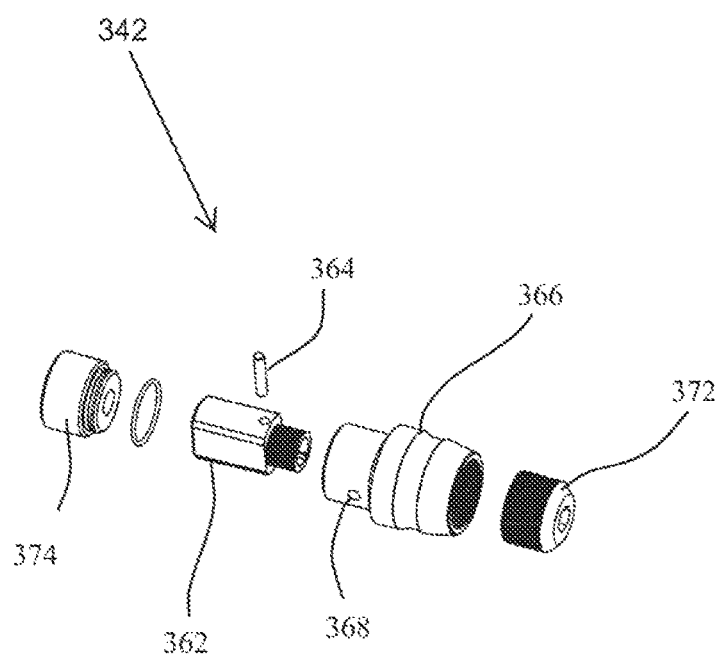
FIG. 11B illustrates the exploded detail of the end attachment to secure the tension member.

FIG. 11B illustrates the parts of fixed nut 342. It includes a cylinder 362 that engages the partially threaded end of the tension rod. A pin 364 stops the insertion of the tension rod to the right depth within the cylinder 362. Housing 366 covers the cylinder (which is actually rectangular in outer cross sectional shape to resist rotation within housing 366) and provides the correct shape to mate within the fork leg. Housing 366 includes a hole 368 to receive the set screw. An end screw cap 372 is secured to the end of the housing and also is fastened to the outer end of cylinder 362. An inner cap 374 completes the assembly. It includes an inner aperture to receive the tension rod therethrough.

FIGS. 12 through 28 illustrate additional embodiments of quick-release and braking assemblies of the present invention. Note that while these illustrate the quick-release ("QR") assembly and brake assembly on front forks of a bicycle, a similar arrangement may be employed on a rear wheel and swing arm or stays of a bicycle. Furthermore, the system may be employed on the front or rear of any wheeled vehicle, such as a motorcycle. The brake mount teachings are easily adaptable to a motorcycle arrangement on either the front or rear.

FIGS. 12 through 23 illustrate a preferred embodiment of the invention showing a QR assembly with a 5 mm skewer. However, the same basic construction can be used with other diameter skewers, such as 9 mm, 15 mm, or 20 mm. FIGS. 24 through 27 show the invention with a 15 mm skewer, for example.

Figure 12:
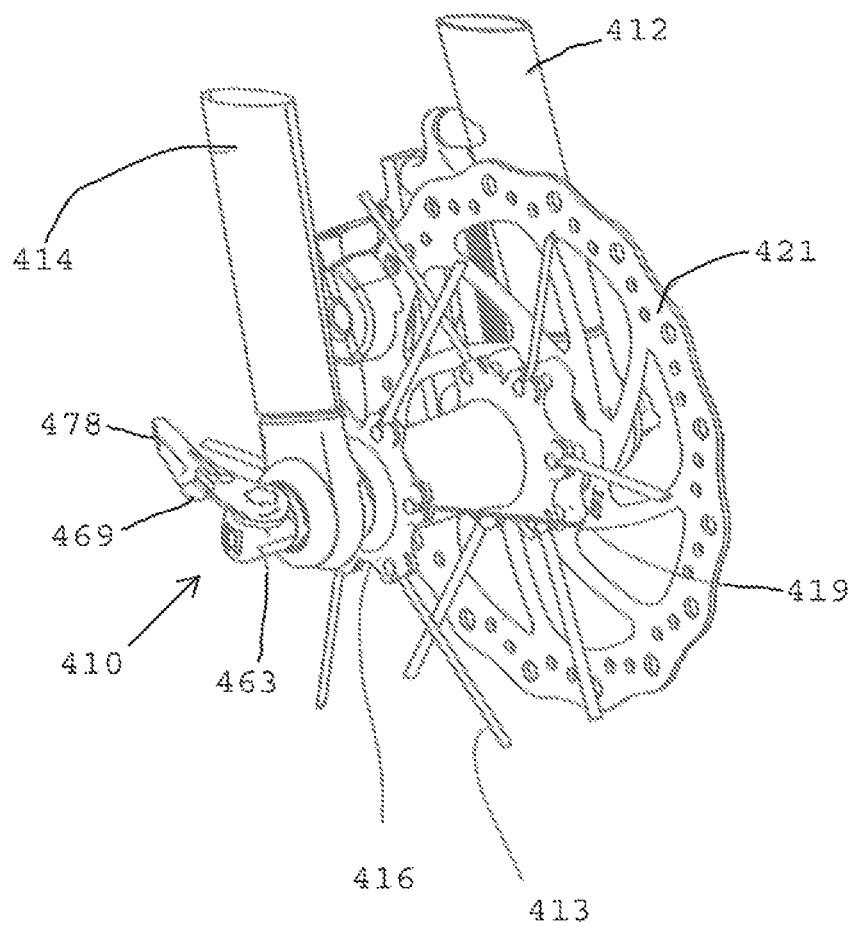
FIG. 12 is an isometric view of a front fork, hub, and brake assembly according to a further embodiment of the present invention.

FIG. 12 shows the QR assembly 410 with the QR lever 478 closed in the tensioned position. The secondary lock 469 is also engaged to ensure that the lever cannot be accidentally opened. The QR assembly holds the bicycle wheel secure between right fork leg 414 and left fork leg 412 by securing the hub assembly 416, with spokes 413, between the fork legs. The brake disc 421 is also held by the hub by a brake disc flange 419. The brake is preferably secured to the left fork leg 412 by a brake mount bracket. The bracket aligns the brake with the brake disc 421. More discussion of the brake mount will follow below in connection with FIGS. 22 and 23.

The tensioned and locked arrangement shown in FIG. 12 is the configuration of the QR assembly ready to ride. The QR lever has the system tensioned in a secure position with the lever preferably extending rearward relative to the bicycle. In this position, the lever is not likely to snag on an obstacle, such as rocks, brush, or other vegetation, that may be encountered while riding. As discussed above in connection with previous embodiments, the secondary lock also ensures that the lever is not inadvertently opened, releasing the tension holding the fork legs and hub together.

Figure 13:
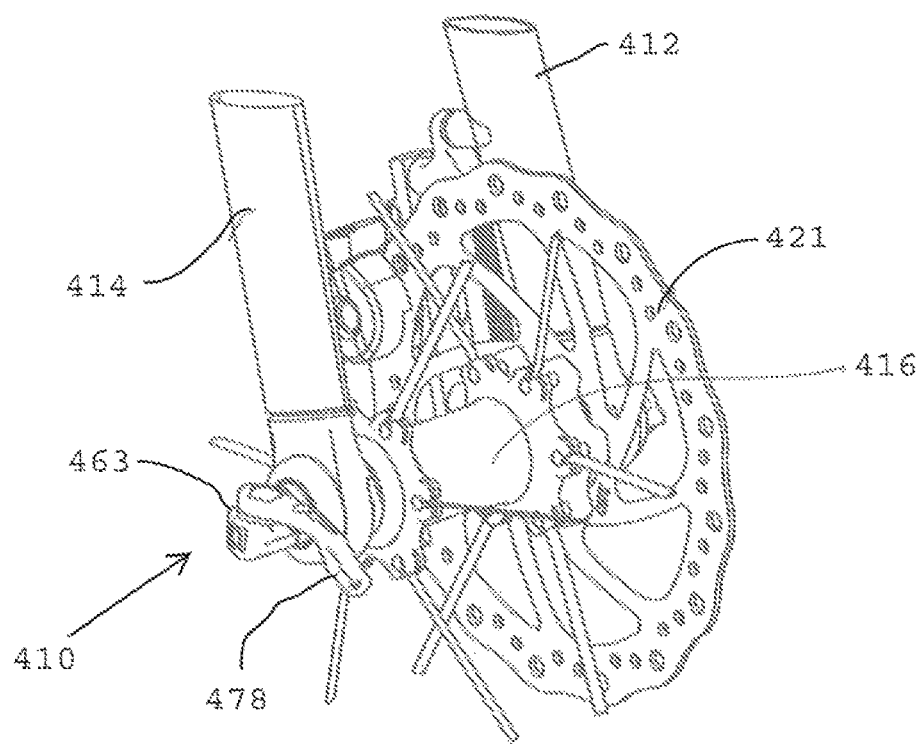
FIG. 13 illustrates the assembly of FIG. 12 with the quick-release lever open.
Figure 14:
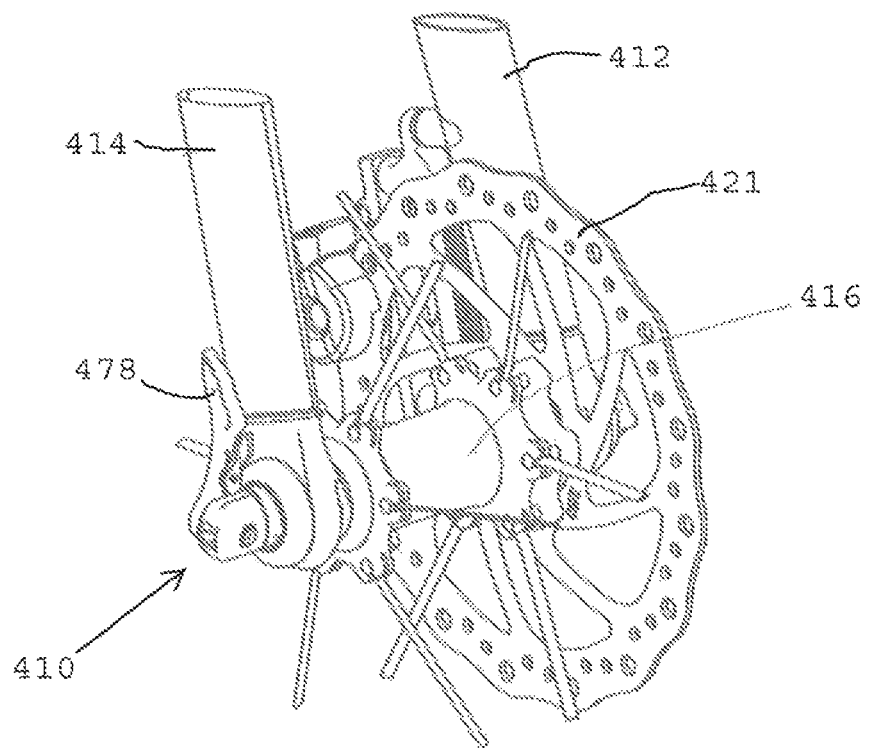
FIG. 14 is another view of the assembly with the lever pivoted up to a removal position.
Figure 16:
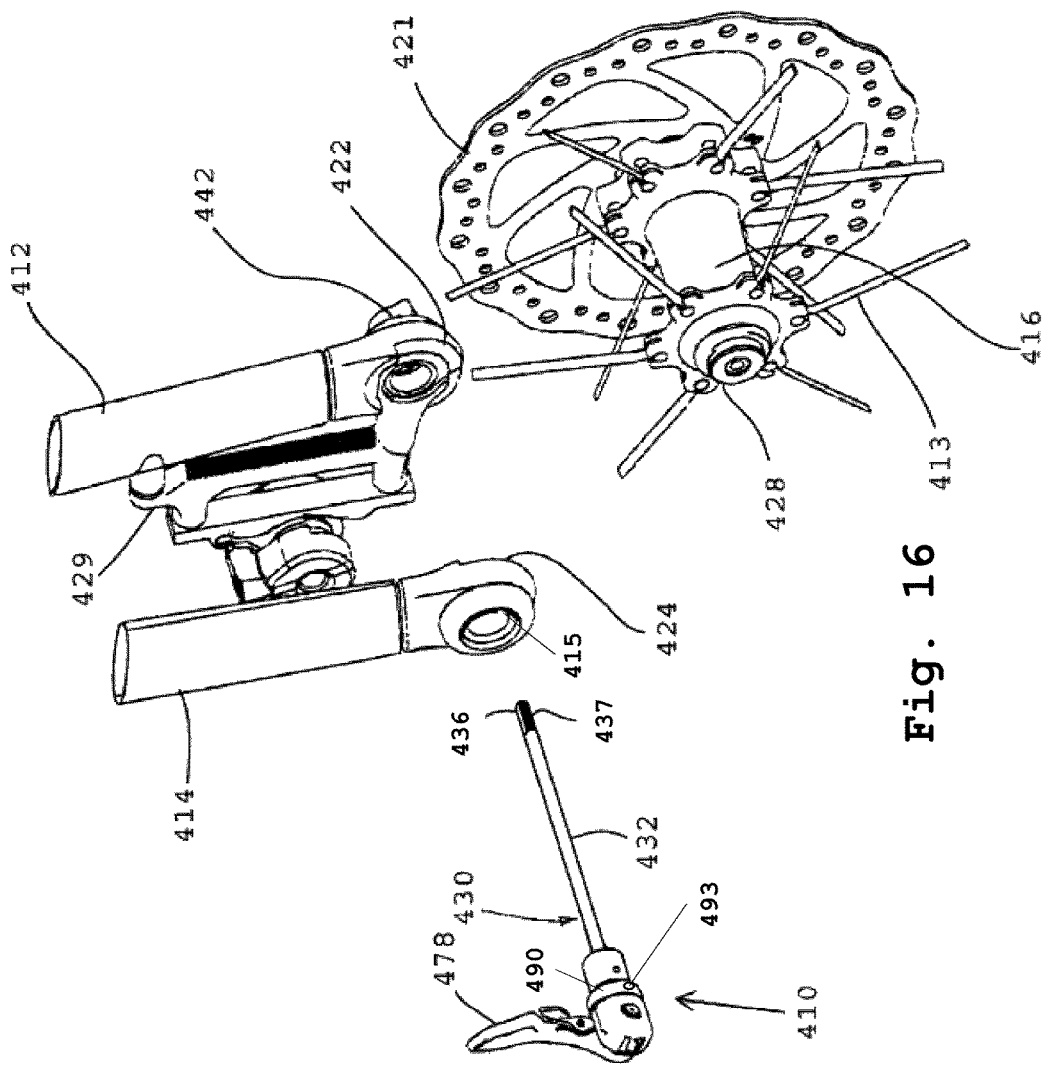
FIG. 16 shows the hub removed from the forks.

FIG. 13 shows the QR lever 478 swung forward, releasing the tension between the left fork leg 412, the right fork leg 414, and the hub assembly 416. To move the QR lever 478 this way, the user first presses on the secondary lock 469 of FIG. 12 to release the lock and allow movement of the QR lever 478. With the QR lever 478 in this position, the QR assembly 410, including the skewer rod 432 (hidden in this view within the hub) can be rotated. As discussed above, rotation is preferably limited by a clocking configuration of the QR assembly 410 relative to the left fork leg 412 and the right fork leg 414. Thus, rotation preferably is held to about 90 degrees. As seen in FIG. 14, the rotation of the QR lever 478 is preferably upward to a substantially vertical position. As shown in FIG. 16, this position releases the teeth 437 on the end of the skewer rod 432 from engagement with the nut assembly on the opposite side from the lever, in a manner similar to that explained above with other embodiments. Note that the skewer rod 432 can alternatively be fixedly secured to the adjustment nut 442 on the opposite side of the lever rather than to the QR lever. In such an embodiment, the adjustment nut 442 is pulled from the hub 416 and left fork leg 412 and right fork leg with the skewer rod 432 secured thereto rather than pulling the lever with the skewer secured thereto.

Figure 15:
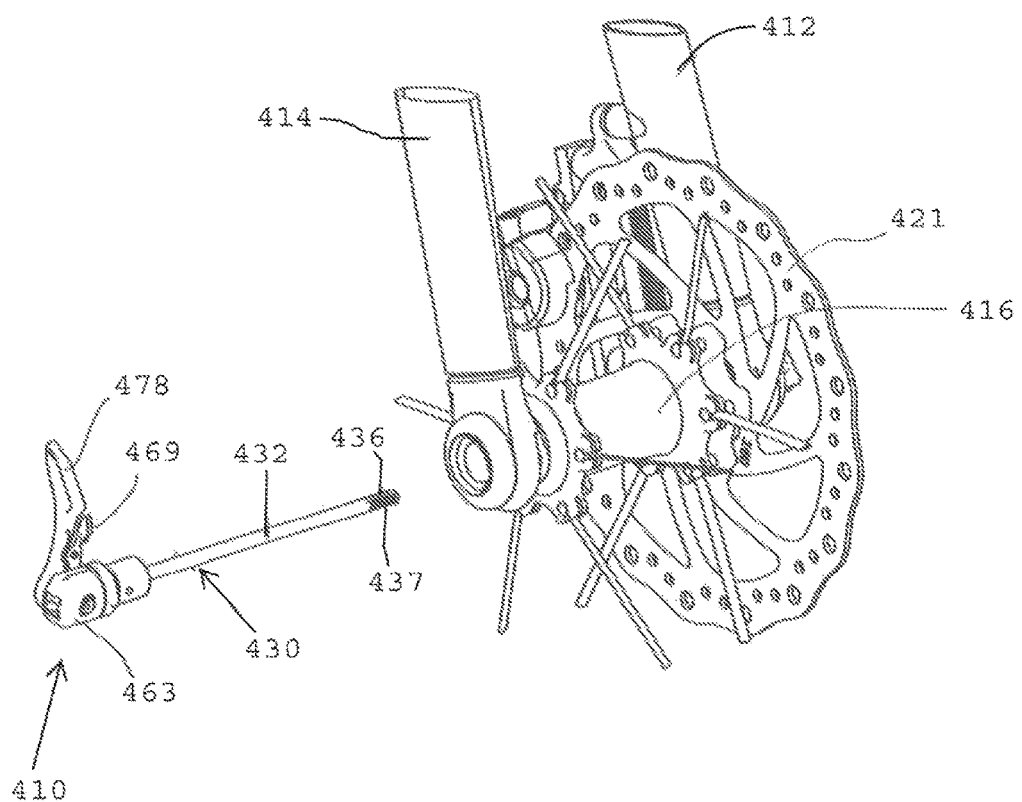
FIG. 15 shows the quick-release assembly removed from the forks and hub.

FIG. 15 shows the QR lever 478 with the skewer rod assembly 430 pulled from the hub 416 and the left fork leg 412 and the right fork leg 414. The QR lever 478 is secured to the cam follower housing 463 that is in turn secured to a cam (hidden within the housing in this view) and to the skewer rod 432. The distal end of the skewer rod 432 includes teeth 437 and flats 436, as discussed in previous embodiments above.

Once the skewer rod assembly 430 (including at least the skewer rod 432, the collar 490 with dead stop 493, and the QR lever 478) of the QR assembly 410 is removed from the hub assembly 416, the left fork leg 412, and the right fork leg 414 (with recess 415), the hub assembly 416 (with spokes 413, rim, and brake disc 421 attached) may be removed from the left fork leg 412 and the right fork leg 414 as shown in FIG. 16. Note that the adjustment nut 442 on the distal side from the QR lever 478 preferably remains secured to the left fork leg 412.

Also, note that slot 422 in the left fork leg 412 and the slot 424 in the right fork leg 414 and brake mount 429 provide shoulders within which the end caps 428 of the hub slide. Thus, the shear impact loads transferring force between the wheel (FIG. 1A) and the left fork leg 412 and the right fork leg 414 travel through the hub end caps 428 and into the slots 422 424. These shoulders formed by the slots 422 424 are much larger in section than the diameter of the skewer rod 432. Thus, the interface between the shoulders and the hub end caps 428 is a much better load path for transferring forces through the bicycle from the ground impacts. The skewer rod 432 is sufficiently strong to tension the system, while remaining relatively lightweight.

Figure 17:
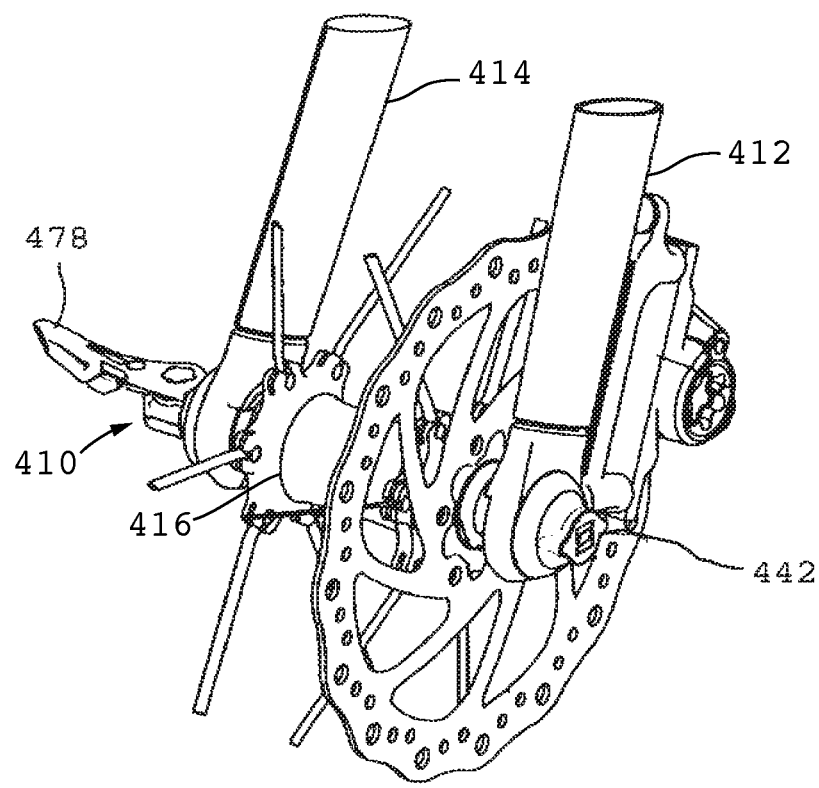
FIG. 17 illustrates the position of the quick-release lever for tension adjustment of the nut on the opposite side from the lever.

FIG. 17 shows the QR assembly 410 inserted within the left fork leg 412 and the right fork leg 414 and hub assembly 416 in an intermediate position. The QR lever 478 is pivoted just 90 degrees outwardly from its tensioned and locked position. Thus, the QR lever 478 is between the positions illustrated in FIGS. 12 and 13. This is preferably an adjustment position for use of the adjustment nut 442. When the QR lever 478 is in this position, tightening of the adjustment nut 442 ensures that the right amount of closed-lever tension is provided by the QR assembly 410 for riding the bike. Thus, to confirm proper QR assembly adjustment, the QR lever 478 is opened 90 degrees—just parallel with the skewer rod—and the adjustment nut 442 is hand-tightened. This is a detent position when rotation of the QR lever 478 must start building the clamping forces on the overall structure. Then the QR lever 478 may be closed by pivoting it rearward into the riding position as shown in FIG. 12. Proper tension is ensured.

Figure 18A:
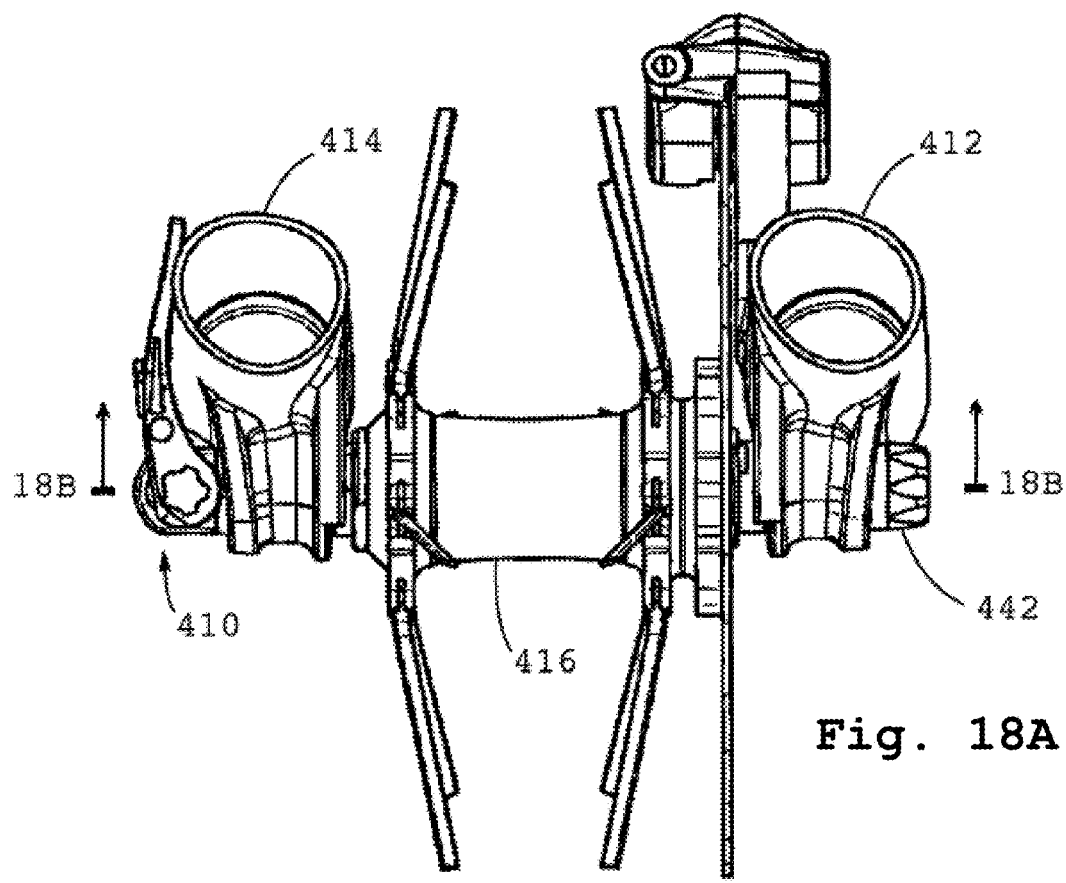
FIG. 18A shows the assembly in top view, the forks having been partially cut away.
Figure 18B:
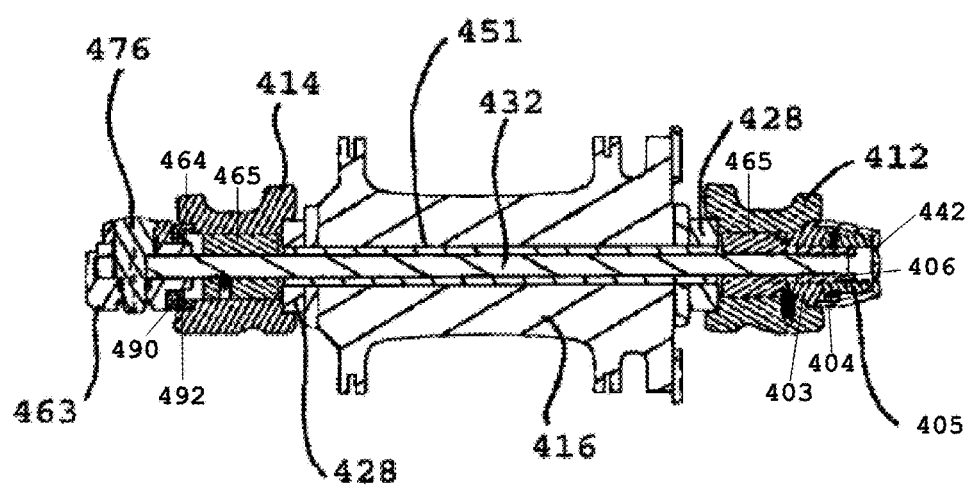
FIG. 18B is a cross-section view of the hub and QR assembly of FIG. 18A taken along section lines 18B-18B.

FIG. 18A is a top view of the QR assembly 410 securing the hub assembly 416 to the left fork leg 412 and the right fork leg 414. This is a slightly different embodiment, as the adjustment nut 442 has a different outer shape. Note that this shows the locked position of the QR lever 478. In the locked position, the camshaft 476 positions the cam at the outer placement for tensioning the skewer rod 432, as seen in FIG. 18B. FIG. 18B illustrates a cross-sectional view of the assembly shown in FIG. 18A. Also shown in the cross-sectional view is the interface between the end caps 428 and the shoulders of the slots 422. This embodiment does not show the integration of the brake mount with the lower portion of the left fork leg 412. However, the force transfer is evident between the end caps 428 and the shoulders of the fork slots or "dropout" slots. In this embodiment, an axle sleeve 451 extends within the hub from near the outer sides of the end caps all the way through the hub assembly 416. This also strengthens the hub assembly 416 to support the loads thereon. The cross-sectional view of FIG. 18B also shows the detail of the skewer rod assembly 430 as shown and described below in the discussion of FIGS. 19A-B and the elements shown in FIG. 22.

FIGS. 19A-19B show more detail of the skewer rod assembly 430 with the lever 478. The collar 490 includes a dished-out recess 491 into which the side of the lever 478 moves as it pivots. This collar 490 restricts the rotational movement of the lever 478 about an axis perpendicular to the longitudinal axis of the skewer rod 432 unless the lever 478 and housing 463 are rotated about the longitudinal axis to the proper locking location, in which the teeth 437 at the end of the skewer rod 432 engage the teeth 409 within a cavity of the skewer receiver 406. This arrangement prevents the lever 478 from being closed in a non-locking position and, thus, provides an extra degree of safety.

The collar 490 also has a rotational "dead stop" 493 that rides within a recess 415 in the right fork 414 leg "dropout" opening. This provides the proper alignment of the skewer rod 432 for an engaged and disengaged orientation with the threads 437 and flats 436 on the distal end of the skewer rod 432. The lever 478 runs through the cam follower housing 463 and the end of the skewer rod 432. The camshaft 476 is secured to and projects laterally from the end of the lever 478. The camshaft 476 includes a cam 480 surface that engages the end of the skewer rod 432. The end of the skewer rod 432 includes an oblong hole 482 to receive the cam 480 and move axially therewith while remaining stationary side to side relative to the forks and hub. A thrust washer 492 is provided to bear against the collar 490, held in place by the retainer ring 464. One version of such a thrust washer 492 is also shown in FIGS. 20A-E. It provides a detent function to give feel to the rotational positions of the lever 478 about the axis of the skewer rod 432, such as the engagement and non-engagement orientations of the teeth 437 of the skewer rod 432 with the teeth 409 of the skewer receiver 406. The skewer rod assembly may also include a spacer 465.

Figure 19C:
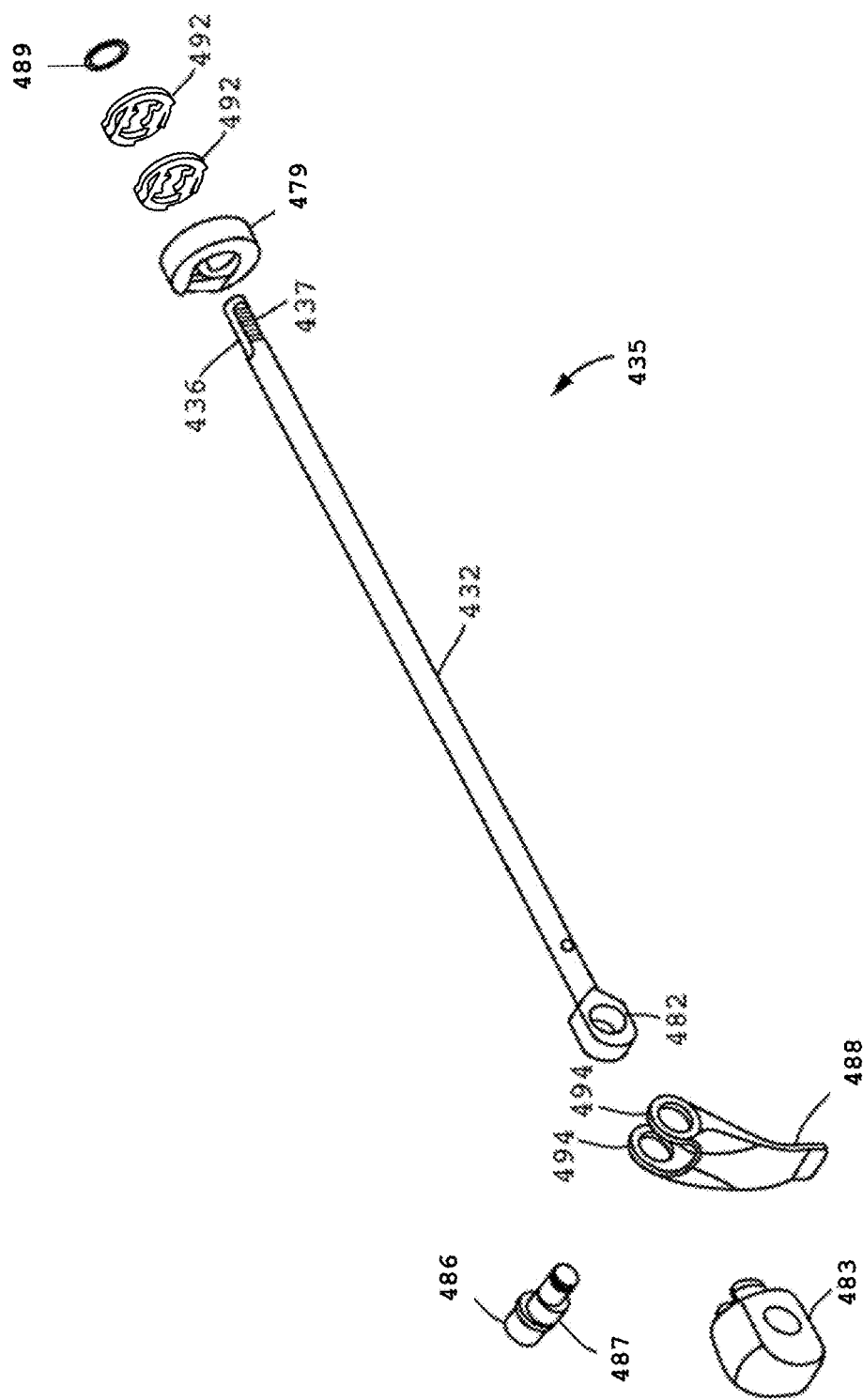
FIG. 19C illustrates an exploded view of an alternate embodiment of a QR assembly.

A slightly different embodiment is shown in FIG. 19C. The lever 488 includes dual flanges 494 for securing the camshaft 486, with cam 487, in the cam follower housing 483 between them, as in earlier embodiments herein. The "clocking" is provided by one or more 90 degree clocking washers 492 that are positioned adjacent to the collar 479, and held in place by the retainer ring 489. A 90-degree recess is provided in the clocking washer 492 and a projection on the fork leg, or secured thereto, rides within the recess.

The clocking washer 492 of FIGS. 20A-E includes a clocking recess 495 (FIGS. 20A-D) as well as a spring feature 496 and a detent feature. The detent is angled outward of the plane of the washer as is a tab on the other side from the detent. This provides a spring resistance feature for a smooth tensioning of the system.

Figure 21:
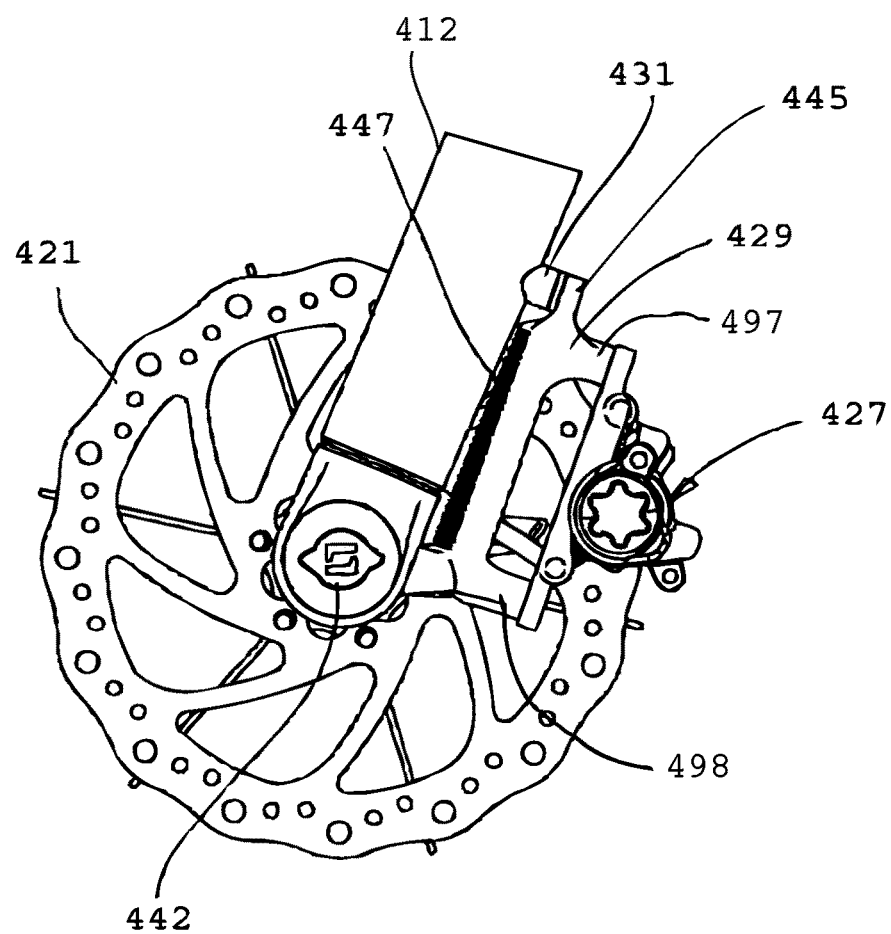
FIG. 21 illustrates a side elevation view of a fork and brake mount assembly.

FIG. 21 shows a side view of the structure from the disc-brake side. The adjustment nut 442 includes lobes for hand tightening. Tightening with a tool is thus discouraged.

Many parts of the brake assembly 427 are also shown in this view. The brake assembly 427 is secured to a brake mount 429. The brake mount 429 is replaceable to accommodate different sizes of brake discs 421. The brake mount 429 ensures that the alignment of the brake assembly 427 with brake disc 421 is proper. The mount is preferably secured to the left fork leg 412 through a boss 431 fixed to the leg. The brake mount 429 includes an upper extension 497 and a lower extension 498 for fastening the brake assembly 427. A portion (preferably a forward portion) of the brake mount 429 includes fins 447 to aid in cooling the brake mount 429. These fins 447 dissipate heat built up by the brake pads and brake disc 421. The heat that transfers to the left fork leg 412 is thus reduced. This helps reduce the possibility for heat damage to the left fork leg 412. An insulating washer between the upper mount flange 445 and the brake mount boss 431 also helps keep heat away from the left fork leg 412.

Figure 22:
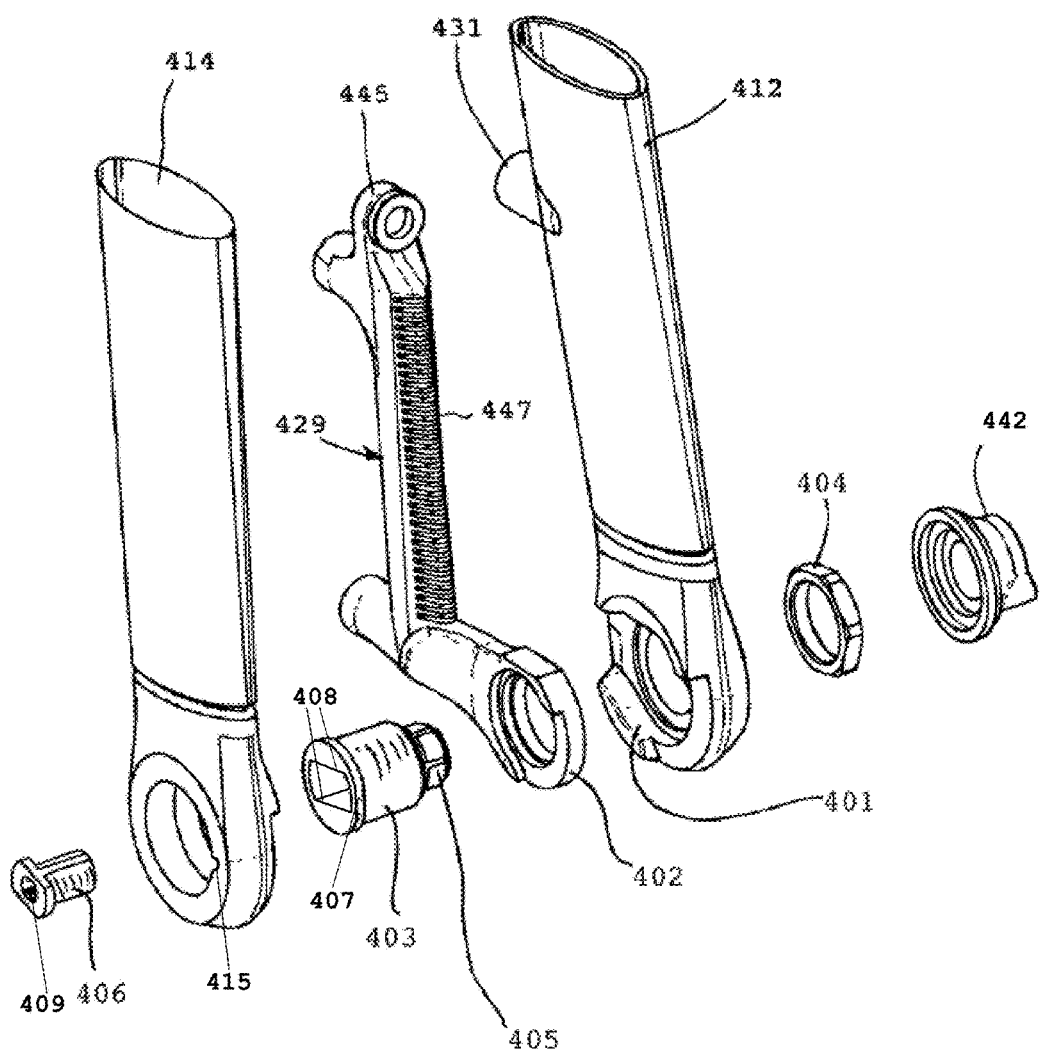
FIG. 22 illustrates an exploded view of the fork and brake mount assembly.

The brake mount lower attachment is better shown in FIG. 22. It is secured to the dropout region of the left fork leg 412. Although alternate embodiments position it on the right fork leg 414, right fork leg 414 and left fork leg 412 can be switched throughout this description. A mount interface 401 is provided in the lower end of the left fork leg 412 to receive the dropout interface 402 for securement and alignment of the brake mount 429. A mount bolt 403 extends through the dropout interface 402 and the mount interface 401 to engage a mount nut 404 on the outer side of the left fork leg 412. The mount nut 404 is threaded onto the outer barrel face of the mount bolt 403 inward of the adjustment head 405. The adjustment nut 442 engages over the top of the adjustment head 405 on the mount bolt 403. Rotating the adjustment nut 442 rotates the adjustment head 405 to thereby move the skewer receiver 406 in and out axially relative to the skewer. This provides tension adjustability of the QR system. The adjustment is performed when the tension is relieved in the system by positioning the lever as shown in FIG. 17 and described above. The skewer receiver 406 does not rotate as the adjustment head 405 rotates and moves the skewer receiver 406 along its threads axially through the mount bolt 403. The flat upper and lower sides of the skewer receiver 406 bear against flat inner sides 408 of the mount bolt 403 such that the skewer receiver 406 cannot rotate. Note that the mount bolt 403 is also fitted to the dropout interface 402 and left fork leg 412 with a fixed angular position by the flat 407 on the side thereof. This alignment aids in the alignment of the QR system, as the rotation and orientation of the QR lever is thus facilitated. Also shown are the brake mount boss 431 of the left fork leg 412 in relation to the upper mount flange 445 and the fins 447.

Figure 23:
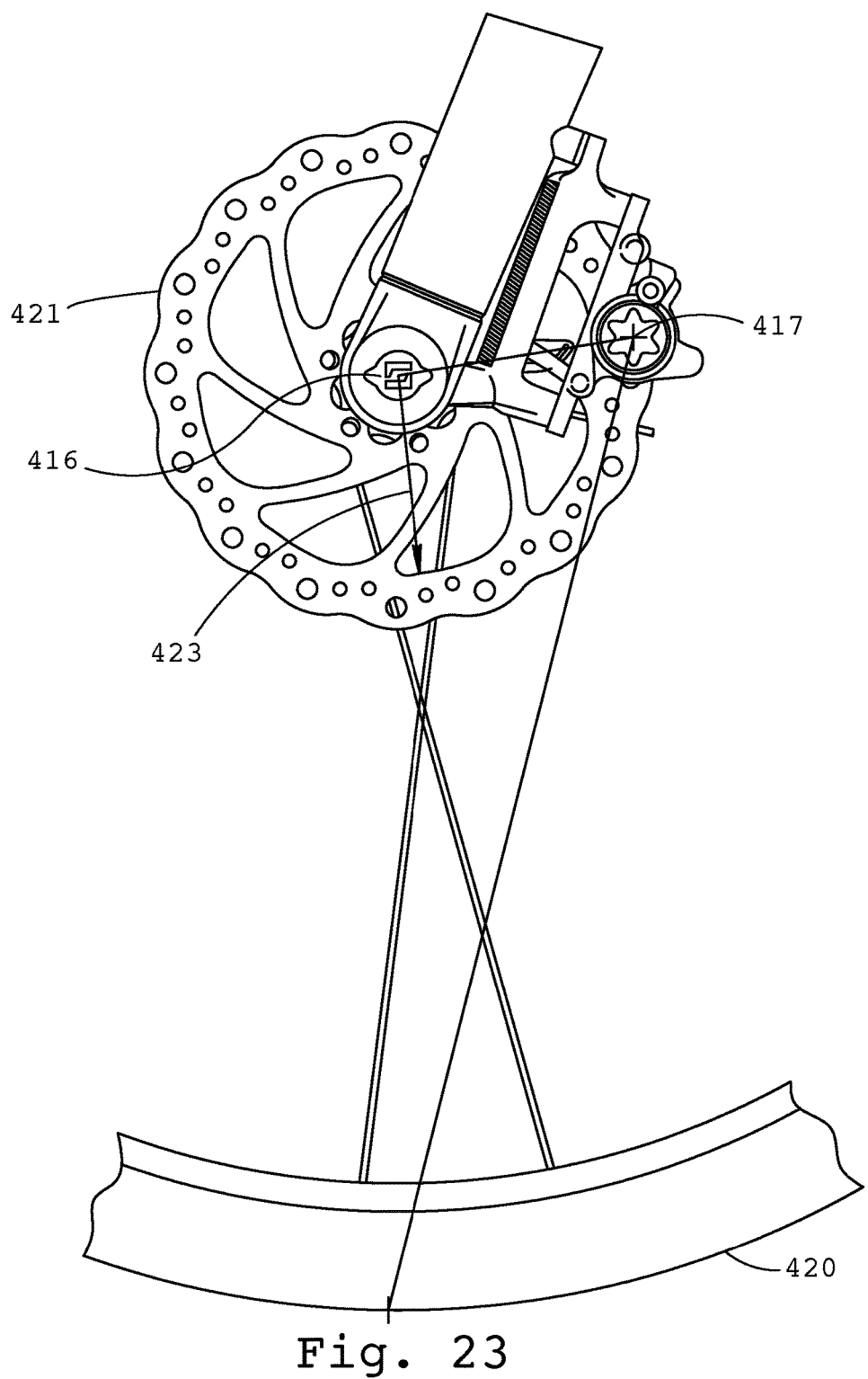
FIG. 23 illustrates the front wheel braking forces.

The forces exerted on the dropout region of the fork legs are diagramed in FIG. 23. The tire 420 contacts the ground and creates a lever arm upon braking that extends between the ground contact and the approximate middle of the brake pad 417 contact with the brake disc 421 or rotor. The lever arm opposing the continued rotation extends between the brake pad 417 and the front axle 418. The force tends to pivot the wheel 11 about the brake pad 417, thus causing a downward force 423 on the hub 416 mount. If the dropout opens downwardly, this force tends to pull off (or loosen) the wheel 11 resulting in a potentially dangerous situation. However, as seen in FIG. 16, the slots 422 of the present arrangement extend transverse to this wheel-dislocating force. Thus, the force is countered by the shoulders of the slots receiving the load from the end caps of the hub 416.

Figure 24:
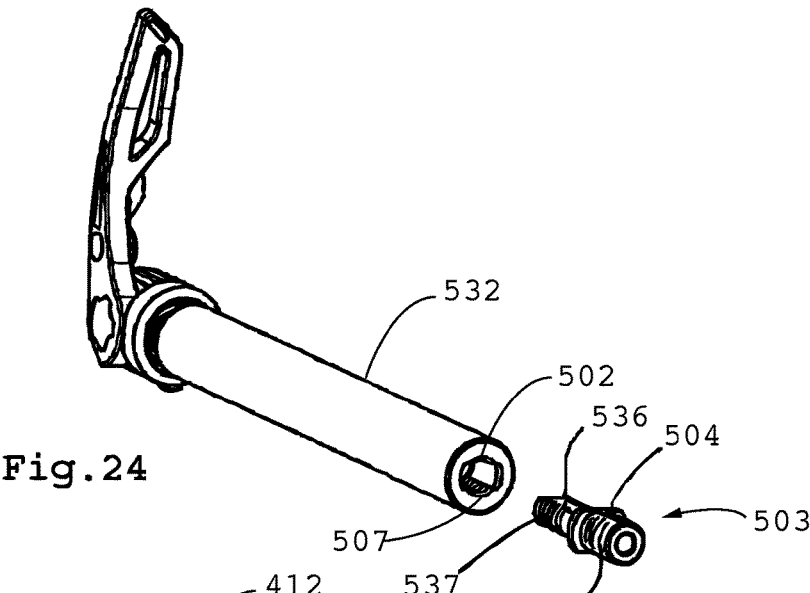
FIG. 24 is a front perspective view of another embodiment of the quick-release assembly with a hollow skewer.
Figures 25B, 25C:
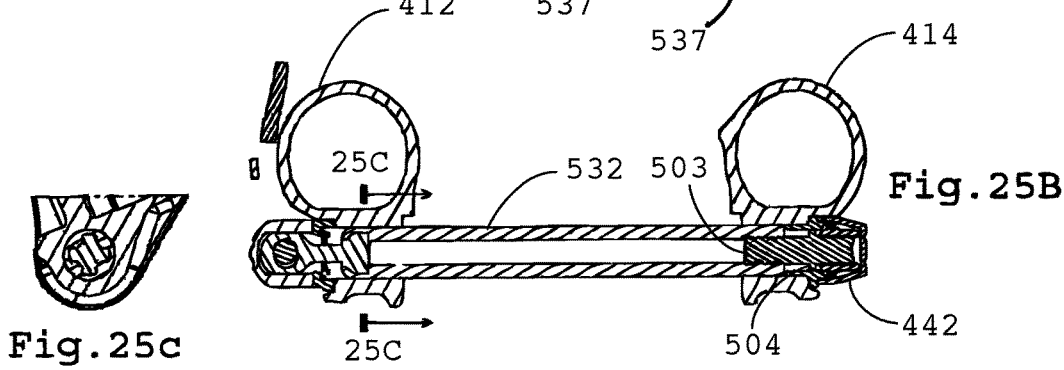
FIG. 25B illustrates a section view of FIG. 25A taken along section lines 25B-25B.
FIG. 25C illustrates a section view of FIG. 25B taken along section lines 25C-25C.
Figure 25A:
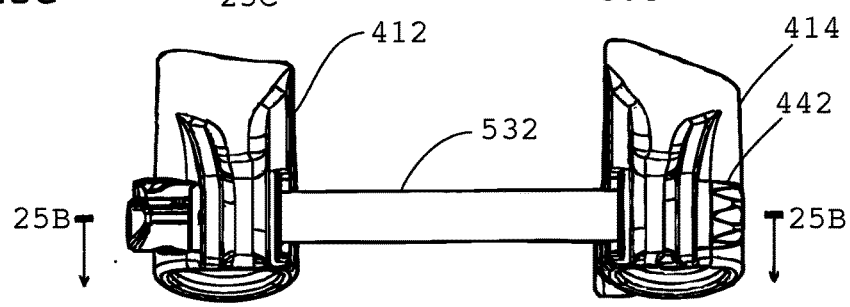
FIG. 25A illustrates a front view of the assembly of FIG. 24 connected to fork legs.

Another embodiment of the present invention is illustrated in FIGS. 24 through 27. This is a 15 mm through-axle 532 with a hollow core. FIG. 24 shows a perspective view, FIG. 25A a front view, FIG. 25B a sectional view of FIG. 25A taken along section lines 25B-25B, and FIG. 25C is a sectional view of FIG. 25B taken along section lines 25C-25C. In FIG. 24, through-axle 532 includes a female engagement receiver 502 with inner threads rather 507 than a bayonet-style with outer threads. The inner threads 507 are provided on the left-side fixed end. An adjustment and engage screw 503 (FIGS. 24 and 25B) is provided with threads 537 (FIG. 24) on both sides of a flange 504 with flat sides 536. In FIG. 24, flat sides 536 retain the orientation relative to the left fork leg 412 and the right fork leg 414 (FIGS. 25A and 25B). In FIG. 25B, this allows the adjustment nut 442 (FIGS. 25A and 25B) to push and pull the screw 503 (FIG. 25B) in and out axially to provide for proper tension of the QR system. The adjustment and release of the QR system operates in essentially the same way for the user as described above.

Figure 26:
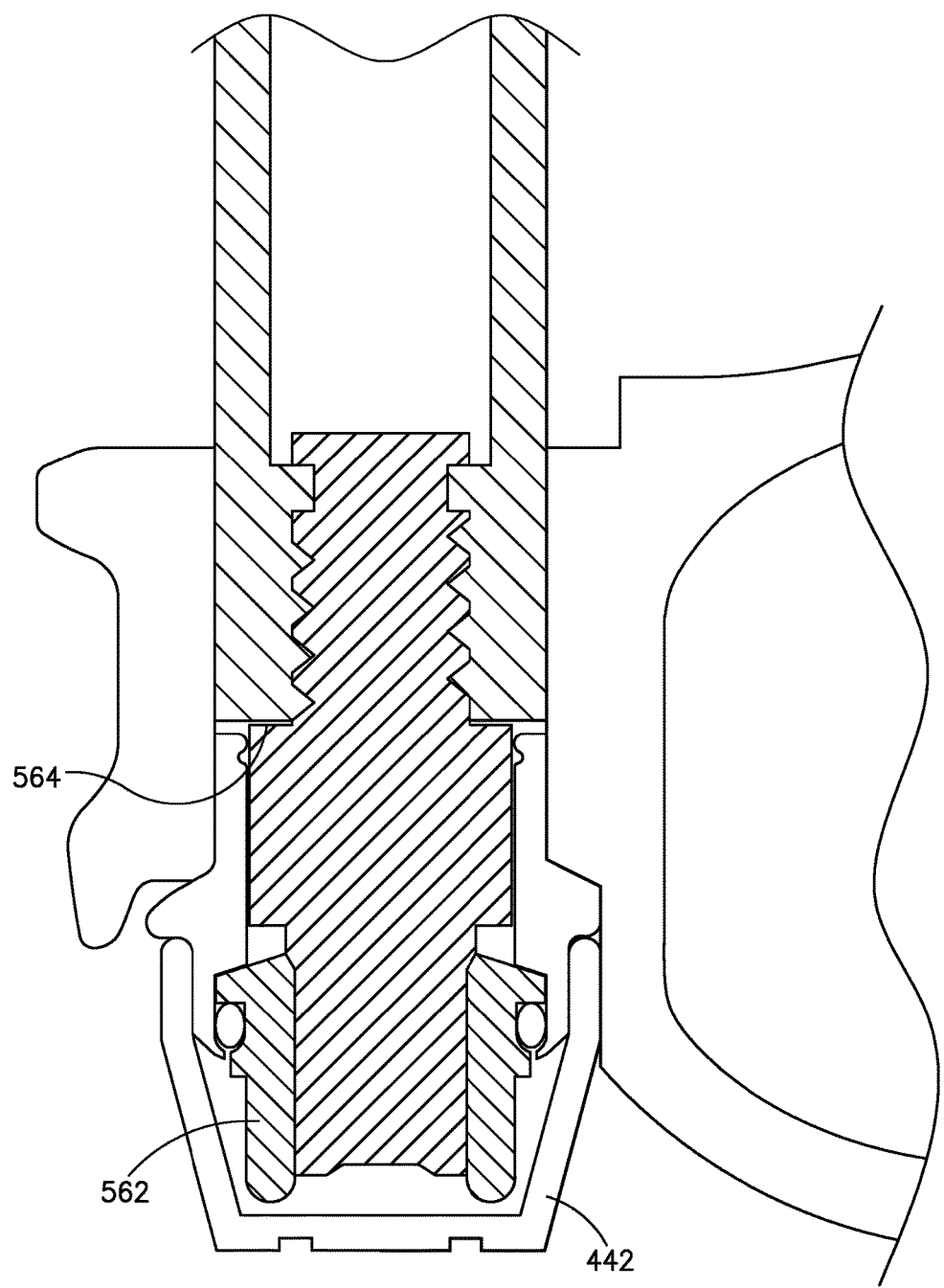
FIG. 26 is a close-up view of the end of the skewer assembly of FIG. 24.

The details of an adjustment and engage screw are shown in FIG. 26. The adjustment nut 442 rotates the collar 562 to adjust the axial position of the screw. The skewer rod 432 is inserted through the right fork leg, through the hub and into the left fork leg. The skewer insertion is stopped by the shoulder 564 at the correct adjusted depth. The skewer is then rotated 90 degrees with the QR lever to interface the threads on the skewer with the engagement threads on the screw. The lever is then closed and locked by the secondary retention lock and the proper tension is thus provided.

Figure 27A:
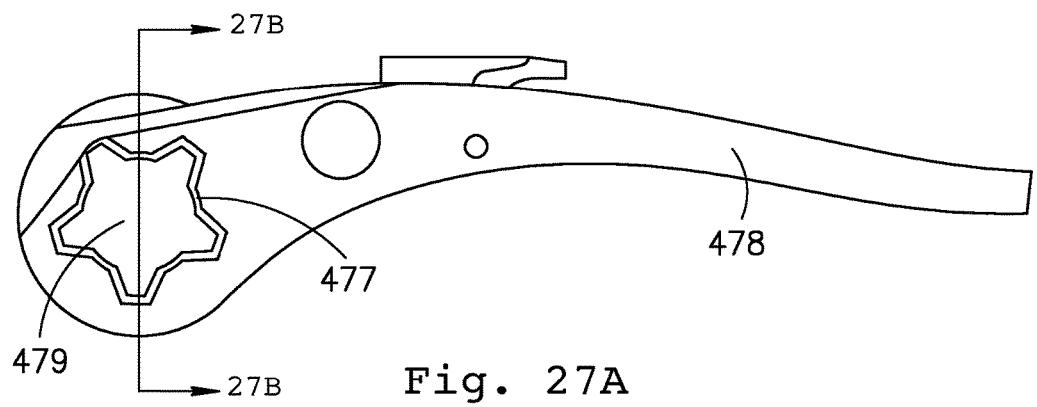
FIG. 27A is a front view of the lever end of the skewer of FIG. 24.
Figure 27B:
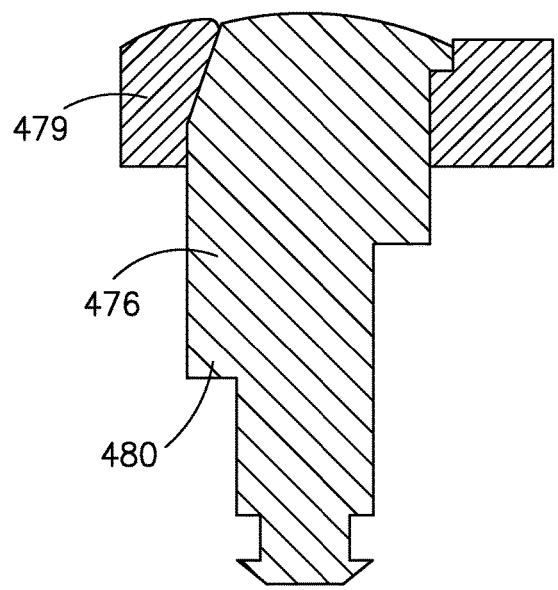
FIG. 27B is a sectional view of FIG. 27A taken along section lines 27B-27B.
Figure 27C:
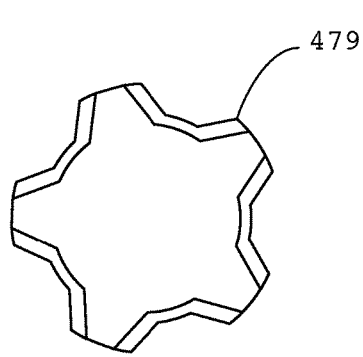
FIG. 27C is a top view of the cam assembly of FIG. 27A.
Figure 27D:
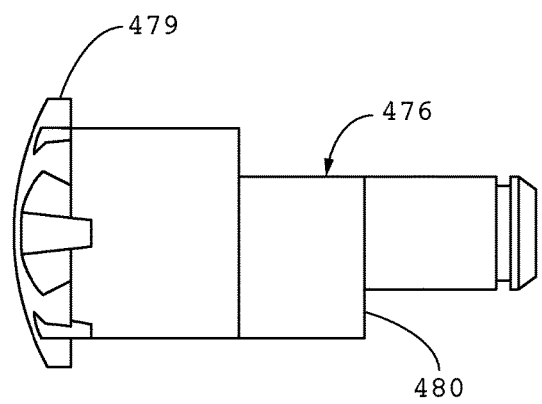
FIG. 27D is a side view of the cam assembly of FIG. 27C.

FIGS. 27A through 27D show the preferred embodiment of the lever and cam arrangement that is used with the QR system of FIGS. 24 through 26. The lobed head 479 of the camshaft 476 (FIGS. 27B and 27D) is forged in place over the end of the shaft. It is secured within the end of the QR lever 478 (FIG. 27A) to be rotated thereby. Also illustrated in FIGS. 27B and 27D, is the cam 480 in relation to the lobed head 479.

An alternate embodiment of the skewer rod 232 is disclosed in FIGS. 28A and 28B. This may be a simple skewer rod 232 similar to current systems available that requires the user to screw on the cap. Alternatively, it may be a 90-degree-turn system as taught above. The advantageous aspect to this system of this embodiment is the depth dead stop that provides the user with the proper tension when the QR lever is closed with the cam pulling the skewer into tension. In the FIG. 28A, the depth stop is provided by the end of the bayonet skewer hitting the inner end 602 of the T-nut 603. The T-nut 603 is engaged in the fork leg directly or indirectly (not shown). In this embodiment, a setscrew 604 is used to adjust the proper tension depth. In FIG. 28B, a stopping face 606 on the shaft is provided at the inward end of the threads 607 to bear against the end face 608 of the T-nut 603 to stop it at the proper location for adequate tension.

Figure 29:
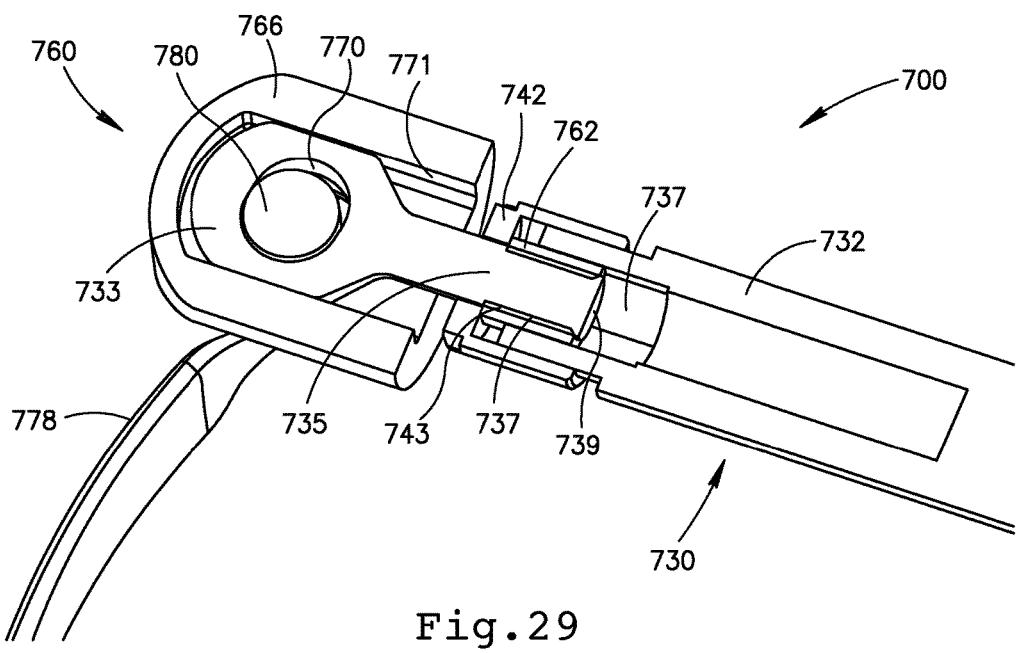
FIG. 29 is a partial sectional view of a further embodiment of a quick-release assembly.

FIGS. 29-32 illustrate a further alternate embodiment of a QR skewer assembly 700 according to the present invention. In some ways, this embodiment is a simplified version that accommodates larger axles, preferably 15-20 mm in diameter. As shown in FIG. 29, skewer assembly 730 couples to QR assembly 760. QR assembly 760 includes a housing 766 that carries the QR lever 778 coupled to the housing with a cam 780. A cam follower 733 nests within housing 766. Housing 766 includes a housing slide aperture such that cam follower 733 is translatable relative to housing 766 along a longitudinal axis of cam follower 733, which coincides with a longitudinal axis of skewer rod 732. Cam follower 733 is coupled to cam 780 with a follower bore 770 surrounding the cam 780. Follower bore 770 is transversely oblong in shape, such that as QR lever 778 is rotated 180 degrees, cam 780 moves side to side within the bore as it also moves back and forth in the longitudinal direction relative to skewer rod 732. This action tightens or loosens the QR skewer assembly on the vehicle, as described previously with other embodiments.

Cam follower 733 includes a follower shaft 735 that extends within the end of skewer rod 732. Follower shaft 735 includes threads 743 that engage internal threads within a threaded block 762. In the preferred form of this embodiment, the opposite end of the skewer rod 732 includes the threads and flats that engage a fastener, such as a thumbnut (not shown) upon 90-degree rotation of the shaft by rotating the QR lever 778 about the longitudinal axis of the shaft (skewer rod 732). Housing 766 is keyed to the end of tension rod 732 so that the two rotate together about the longitudinal axis of skewer rod 732 for engagement at the opposite end (not shown).

The threaded block 762 is longitudinally slidable within a guide channel 737 in the end of skewer rod 732. The outer face of threaded block 762 is non-circular in cross section and mates with a mating internal shape of guide channel 737. Thus, the block can translate but not rotate within the channel. The outer end of threaded block 762 is secured to an adjustment knob 742 that is threadably engaged to the end of skewer rod 732. Rotating the adjustment knob 742 translates threaded block 762 longitudinally within the guide channel 737 such that the tension on the overall QR skewer assembly 700 can be adjusted. Adjustment knob 742 changes the position of QR assembly 760 relative to the skewer assembly 730.

Figure 30:
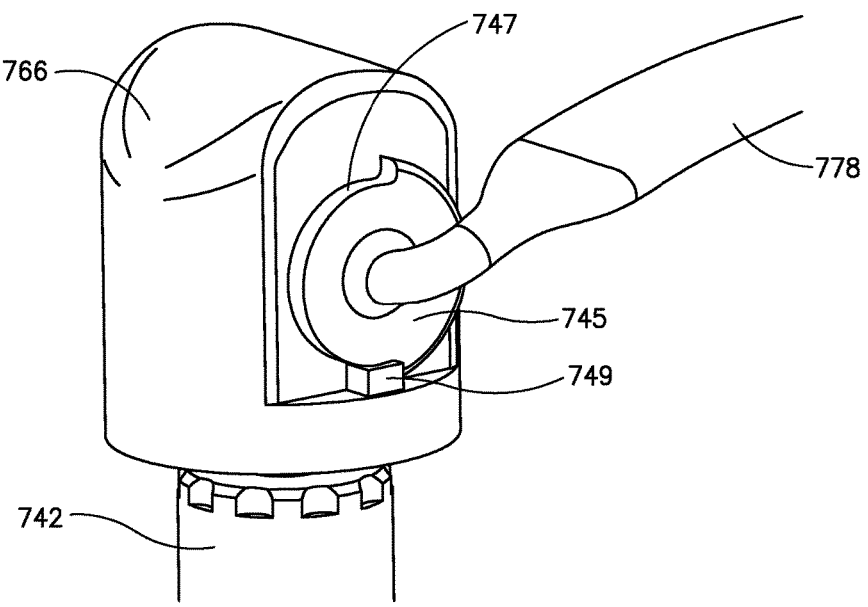
FIG. 30 is a close-up view of the limit mechanism of the assembly of FIG. 29.

FIG. 30 illustrates a preferred rotation limit mechanism for QR lever 778. QR lever 778 includes a limit disk 745 that abuts against the outer side of housing 766. Limit disk 745 includes a peripheral recess that extends slightly more than 180 degrees around the periphery of the disk. This recess and periphery engages an external tooth 749 on the side of housing 766. The limit disk 745 and the external tooth 749 limit the rotation of QR lever 778 preferably to about 180 degrees. This rotation moves cam 780 from an innermost longitudinal position with QR lever 778 fully open to an outermost (tight) position with QR lever 778 fully closed. In an open position, housing 766 and cam follower 733 can be rotated relative to skewer assembly 730 to release or engage the threads within threaded block 762. Proper depth insertion of the threads within the threaded block 762 is ensured with a clearance head 739 on the end of the follower shaft 735. The clearance head 739 does not include threads and thus will not allow the follower shaft 735 to rotate unless proper insertion is made. Once the threads are engaged, QR lever 778 can be swung to a closed position to tighten the entire QR skewer assembly 700.

Figure 31:
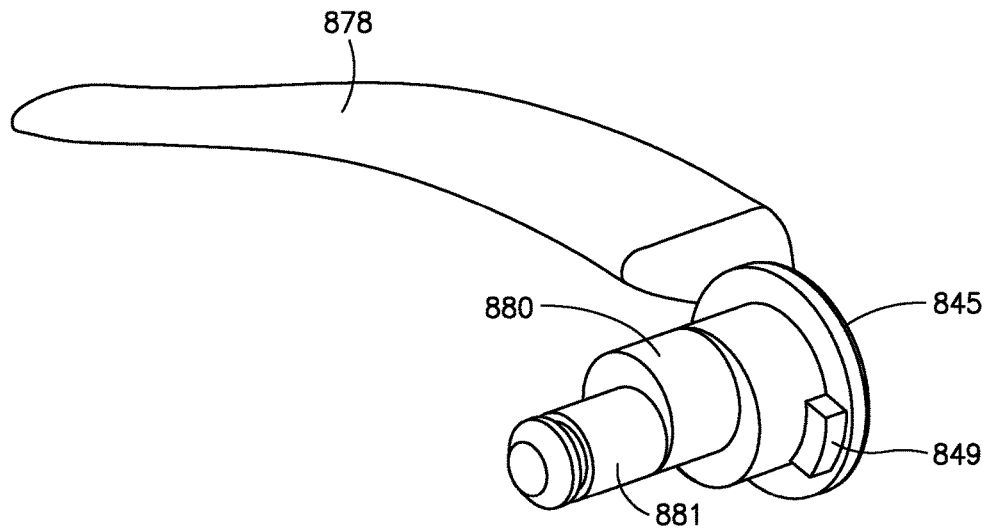
FIG. 31 is a view of a tension lever of the present invention.
Figure 32:
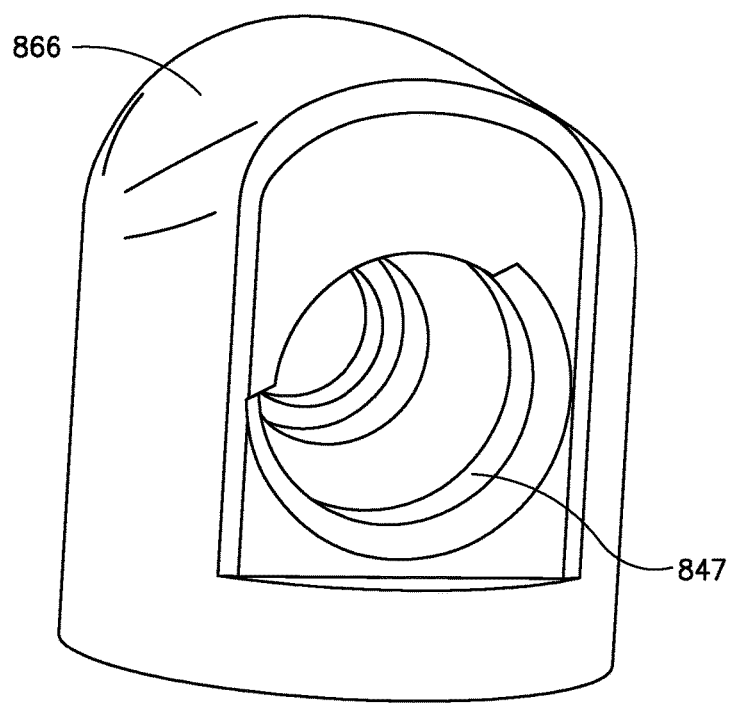
FIG. 32 is a part view of a quick-release assembly housing.

FIGS. 31 and 32 illustrate a slightly modified version of the QR lever 878 (FIG. 31) and housing 866 (FIG. 32) that includes an internal tooth 849 (FIG. 31) and internal recess 847 (FIG. 32) as opposed to the external ones described above in connection with FIGS. 29 and 30. Internal tooth 849 extends from the inner side of limit disk 845, both of FIG. 31, to slide within internal recess 847 in housing 866 both of FIG. 32. Internal recess 847 extends slightly more than 180 degrees to allow approximately 180 degrees of rotation of QR lever 878 relative to housing 866.

Also note in FIG. 31 the configuration of cam 880 on the end of QR lever 878. A pin 881 extends from cam 880. Pin 881 is concentric with limit disk 845 to rotate within the aperture within housing 866 (FIG. 32), such that as QR lever 878 rotates, cam 880 translates relative to housing 866 as discussed above.

All of the embodiments herein provide the user with a system that is quicker to use than current commercially available QR systems, while providing increased safety and performance. For example, better transfer of loads through end caps and shoulders, more precise tensioning of the system without the user having to have special skills, and better primary and secondary safety features to avoid a failure of the wheel and/or brake are all provided.

While the preferred embodiments of the invention have been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A device for securing a wheel, comprising:
   a shaft;
   a receiver configured to engage the shaft to secure the wheel to a vehicle; and
   a wheel release member rotationally coupled to the shaft, and when the shaft is coupled with the receiver, the wheel release member having:
   a first rotational state characterized by freedom to rotate about a first rotational axis between a first wheel release member position and a second wheel release member position, and by an inability to rotate about a second rotational axis that is orthogonal to the first rotational axis;
   a second rotational state characterized by freedom to rotate about the second rotational axis between the second wheel release member position and a third wheel release member position, and by an inability to rotate about the first rotational axis; and
   a third rotational state characterized by a constraint against rotation of the wheel release member about both the first rotational axis and the second rotational axis in the third wheel release member position.

2. The device of claim 1, wherein:
   the shaft includes a first end and a second end opposite the first end, and the first end rotationally coupled to the wheel release member;

wherein the second wheel release member position engages the second end of the shaft with the receiver and the first wheel release member position disengages the second end of the shaft from the receiver.

3. The device of claim 2, further comprising a skewer assembly that includes the shaft and the wheel release member;
wherein the skewer assembly is removable from the vehicle only when the wheel release member is in the first wheel release member position.

4. The device of claim 3, wherein the wheel release member is not rotatable with respect to the shaft while in the first wheel release member position with the skewer assembly removed from the vehicle and the shaft uncoupled from the receiver.

5. The device of claim 2, further comprising:
teeth and flats on the second end of the shaft; and
teeth within the receiver;
wherein the teeth on the shaft engage the teeth within the receiver when the wheel release member is in the first rotational position.

6. The device of claim 2, wherein:
the second end of the shaft and the receiver are adapted to allow the second end of the shaft to be inserted through a hub of the wheel and to engage the receiver when the wheel release member is in the first wheel release member position;
rotating the wheel release member from first wheel release member position to the second wheel release member position about the first rotational axis engages teeth of the second end of the shaft with teeth of the receiver, and the wheel release member is not rotatable about the second rotational axis until the wheel release member is in the second wheel release member position; and
rotating the wheel release member about the second rotatable axis from second wheel release member position to a third wheel release member position applies tension to the shaft and secures the wheel to the vehicle.

7. The device of claim 6, the device further comprising a secondary lock mechanism having a first position that stops the wheel release member from rotating when in the third wheel release member position and a second position that allows the wheel release member to rotate about the second rotational axis from the third wheel release member position.

8. The device of claim 1, wherein:
the shaft including an end and a longitudinal axis; and
the first rotational axis is axial to the longitudinal axis and the second rotational axis is orthogonal to the first rotational axis.

9. The device of claim 1, further including:
a tensioning member configured to engage the receiver and provide selective adjustment of engagement tension between the shaft and the receiver.

10. The device of claim 9, wherein:
the wheel release member includes a detented position along the second rotational axis; and
selective rotation of the wheel release member to the detented position causes a corresponding longitudinal position of the wheel release member relative to the receiver and provides an adjustment position for adjustment of the tensioning member.

11. The device of claim 1, the device further comprising a secondary lock mechanism having a first position that stops the wheel release member from rotating when in the third wheel release member position about the second rotational axis, and a second position that allows the wheel release member to rotate about the second rotational axis from the the third wheel release member position.

12. The device of claim 1, the receiver including a cavity adapted to accept an end of the shaft.

* * * * *